(12) United States Patent
Jia

(10) Patent No.: US 11,269,159 B2
(45) Date of Patent: Mar. 8, 2022

(54) OPTICAL IMAGING LENS ASSEMBLY

(71) Applicant: ZHEJIANG SUNNY OPTICAL CO., LTD., Ningbo (CN)

(72) Inventor: Yuanlin Jia, Ningbo (CN)

(73) Assignee: ZHEJIANG SUNNY OPTICAL CO., LTD.

( * ) Notice: Subject to any disclaimer, the term of this patent is extended or adjusted under 35 U.S.C. 154(b) by 308 days.

(21) Appl. No.: 16/273,852

(22) Filed: Feb. 12, 2019

(65) Prior Publication Data
US 2019/0179113 A1 Jun. 13, 2019

Related U.S. Application Data

(63) Continuation of application No. PCT/CN2018/085632, filed on May 4, 2018.

(30) Foreign Application Priority Data

Sep. 14, 2017 (CN) .......................... 201710828050.2
Sep. 14, 2017 (CN) .......................... 201721177364.2

(51) Int. Cl.
G02B 9/34 (2006.01)
H04N 5/225 (2006.01)
G02B 7/02 (2021.01)
G02B 27/00 (2006.01)
G02B 13/00 (2006.01)

(52) U.S. Cl.
CPC ............... G02B 9/34 (2013.01); G02B 7/021 (2013.01); G02B 13/004 (2013.01); G02B 27/0025 (2013.01); H04N 5/2254 (2013.01)

(58) Field of Classification Search
CPC ........ G02B 9/34; G02B 13/004; G02B 7/021; G02B 27/0025; G02B 27/00; G02B 7/02; G02B 9/58; H04N 5/2254; H04N 5/225
See application file for complete search history.

(56) References Cited

U.S. PATENT DOCUMENTS

| 8,395,846 | B2* | 3/2013 | Yanagisawa | ......... H04N 9/3173 359/649 |
| 2007/0076308 | A1* | 4/2007 | Hirose | .................... G02B 13/18 359/783 |
| 2009/0097137 | A1* | 4/2009 | Cheng | .................... G02B 13/04 359/782 |

(Continued)

FOREIGN PATENT DOCUMENTS

| CN | 202433590 U | 9/2012 |
| CN | 106970454 A | 7/2017 |

(Continued)

Primary Examiner — Stephone B Allen
Assistant Examiner — Gabriel A Sanz
(74) Attorney, Agent, or Firm — Barnes & Thornburg LLP

(57) ABSTRACT

An optical imaging lens assembly is provided. The optical imaging lens assembly includes, sequentially along an optical axis from an object side to an image side, a first lens, a second lens, a third lens, and a fourth lens. The first lens has a negative refractive power. The third lens has a positive refractive power. At least one of the second lens or the fourth lens has a positive refractive power. A center thickness CT2 of the second lens on the optical axis and a center thickness CT4 of the fourth lens on the optical axis satisfy: CT2/CT4<0.5.

18 Claims, 9 Drawing Sheets

(56) References Cited

U.S. PATENT DOCUMENTS

| | | | | |
|---|---|---|---|---|
| 2010/0302647 | A1* | 12/2010 | Hirose | G02B 13/06 |
| | | | | 359/671 |
| 2011/0316969 | A1* | 12/2011 | Hsieh | G02B 13/06 |
| | | | | 348/36 |
| 2013/0003195 | A1* | 1/2013 | Kubota | G02B 27/0025 |
| | | | | 359/764 |
| 2014/0111850 | A1 | 4/2014 | Huang et al. | |
| 2015/0177487 | A1 | 6/2015 | Ahn et al. | |
| 2018/0106979 | A1* | 4/2018 | Chang | G02B 27/0025 |
| 2018/0224636 | A1* | 8/2018 | Uchida | G02B 9/34 |

FOREIGN PATENT DOCUMENTS

| | | |
|---|---|---|
| CN | 207123643 U | 3/2018 |
| JP | H0933802 A | 2/1997 |
| JP | H0961710 A | 3/1997 |
| JP | H0968648 A | 3/1997 |
| JP | 2013120193 A | 6/2013 |
| KR | 20160137830 A | 12/2016 |

* cited by examiner

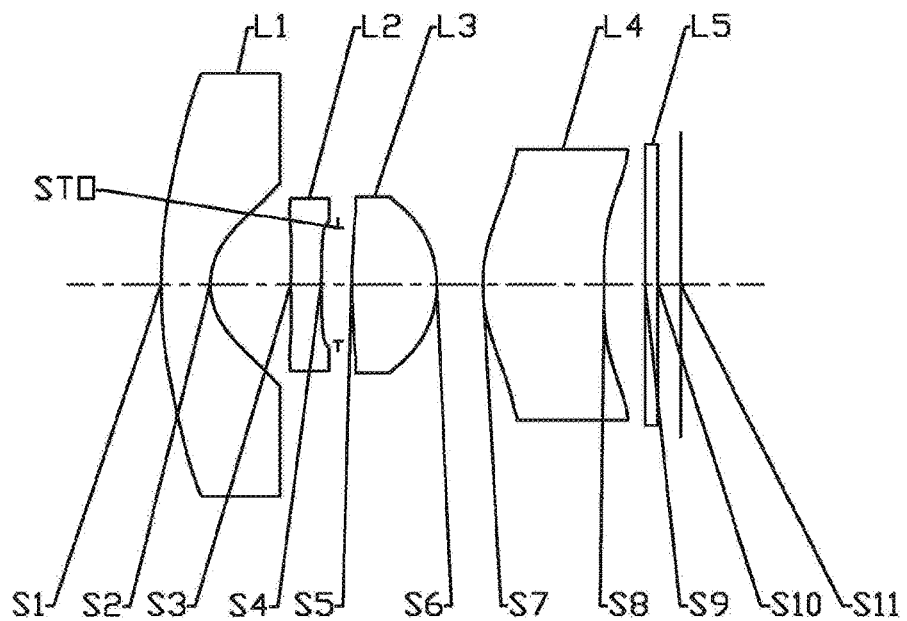
Fig. 1
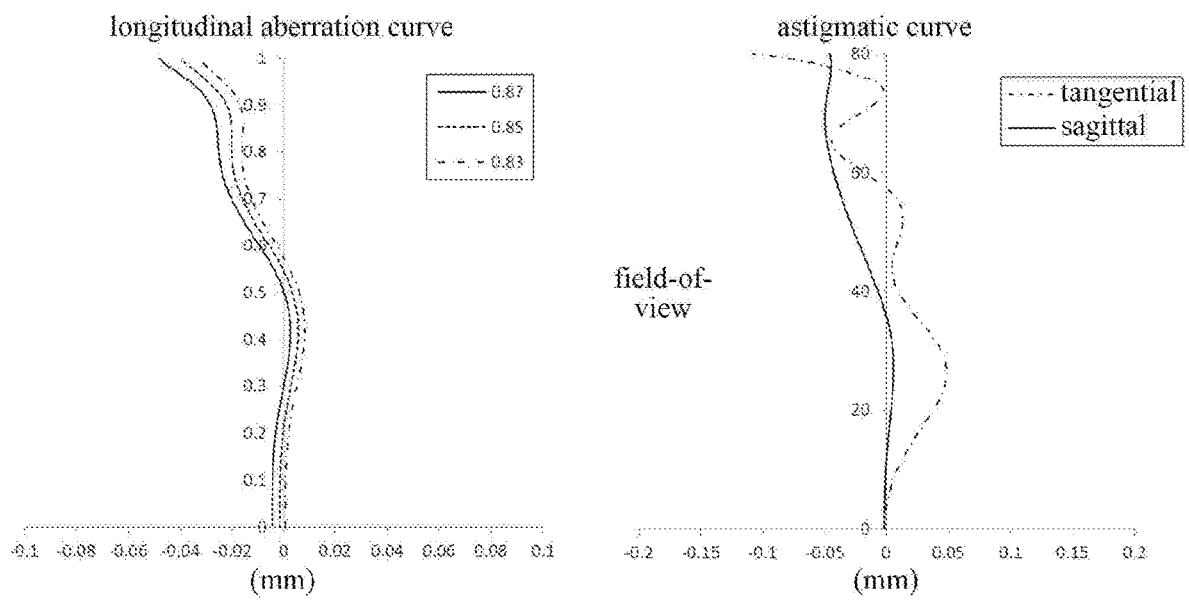
Fig. 2A
Fig. 2B

Fig. 10C                    Fig. 10D

OPTICAL IMAGING LENS ASSEMBLY

CROSS-REFERENCE TO RELATED APPLICATIONS

This disclosure is a continuation of International Application PCT/CN2018/085632, with an international filing date of May 4, 2018, which claims priority to Chinese Patent Application No. 201710828050.2, filed with the China National Intellectual Property Administration (CNIPA) on Sep. 14, 2017, and Chinese Patent Application No. 201721177364.2, filed with the China National Intellectual Property Administration (CNIPA) on Sep. 14, 2017, the contents of which are incorporated herein by reference in their entirety.

TECHNICAL FIELD

The present disclosure relates to an optical imaging lens assembly, and more specifically to an optical imaging lens assembly including four lenses.

BACKGROUND

With the improvement in performance and reduction in size of the commonly used photosensitive elements such as charge-coupled devices (CCD) or complementary metal-oxide semiconductor elements (CMOS), higher requirements for miniaturization, lightweight, and high imaging quality of the counterpart imaging lens assemblies have been brought forward.

A typical configuration of an existing imaging lens assembly has an F-number Fno (total effective focal length of the lens assembly/entrance pupil diameter of the lens assembly) of 2.0 or above, to have a good optical performance while achieving the miniaturization. With the continuous development of portable electronic products such as smart phones, higher requirements for the counterpart imaging lens assemblies have been brought forward. In particular, in situations such as insufficient lighting (e.g., on cloudy and rainy days, or at dusk) or hand trembling, the lens assembly having the F-number Fno of 2.0 or above has been unable to fulfill the higher-order imaging requirements. In particular, in the field of infrared camera, the imaging lens assembly also needs to have a high relative illumination while ensuring a small size and a large aperture, to fulfill requirements of the applications such as detection and identification for the lens assembly.

SUMMARY

The present disclosure provides an optical imaging lens assembly having a large aperture which may be applicable to portable electronic products and may at least or partially solve at least one of the above disadvantages in the existing technology.

According to an aspect, the present disclosure provides an optical imaging lens assembly. The optical imaging lens assembly includes, sequentially along an optical axis from an object side to an image side, a first lens, a second lens, a third lens, and a fourth lens. The first lens may have a negative refractive power. The third lens may have a positive refractive power. At least one of the second lens or the fourth lens may have a positive refractive power. A center thickness CT2 of the second lens on the optical axis and a center thickness CT4 of the fourth lens on the optical axis satisfy: $CT2/CT4<0.5$.

In an implementation, an image-side surface of the first lens may be a concave surface.

In an implementation, a radius of curvature R2 of the image-side surface of the first lens and a total effective focal length f of the optical imaging lens assembly may satisfy: $0.7<R2/f<1.3$.

In an implementation, an image-side surface of the third lens may be a convex surface. The radius of curvature R2 of the image-side surface of the first lens and the radius of curvature R6 of the image-side surface of the third lens may satisfy: $-1<R2/R6<-0.5$.

In an implementation, the center thickness CT2 of the second lens on the optical axis and an edge thickness ET2 of the second lens may satisfy: $0.5<CT2/ET2<1$.

In an implementation, an effective semi-diameter DT21 of an object-side surface of the second lens and an effective semi-diameter DT32 of the image-side surface of the third lens may satisfy: $0.8<DT21/DT32<1.4$.

In an implementation, an object-side surface of the fourth lens may be a convex surface.

In an implementation, an effective semi-diameter DT42 of an image-side surface of the fourth lens and half of a diagonal length ImgH of an effective pixel area on an image plane of the optical imaging lens assembly may satisfy: $0.7<DT42/ImgH\leq1.0$.

In an implementation, a distance SAG41 on the optical axis from an intersection of the object-side surface of the fourth lens and the optical axis to a vertex of an effective semi-diameter of the object-side surface of the fourth lens, and a distance SAG42 on the optical axis from an intersection of the image-side surface of the fourth lens and the optical axis to a vertex of the effective semi-diameter of the image-side surface of the fourth lens may satisfy: $1.0<SAG41/SAG42<1.5$.

In an implementation, an effective focal length f1 of the first lens and an effective focal length f3 of the third lens may satisfy: $-1.2<f1/f3<-0.5$.

In an implementation, the total effective focal length f of the optical imaging lens assembly and an entrance pupil diameter EPD of the optical imaging lens assembly may satisfy: $f/EPD<1.6$.

In an implementation, the half of the diagonal length ImgH of the effective pixel area on the image plane of the optical imaging lens assembly and the total effective focal length f of the optical imaging lens assembly may satisfy: $ImgH/f>1$.

According to another aspect, the present disclosure further provides an optical imaging lens assembly. The optical imaging lens assembly includes, sequentially along an optical axis from an object side to an image side, a first lens, a second lens, a third lens, and a fourth lens. The first lens may have a negative refractive power. The second lens may have a refractive power. The third lens may have a positive refractive power, and an object-side surface and an image-side surface of the third lens may both be convex surfaces. The fourth lens may have a refractive power, and an object-side surface of the fourth lens may be a convex surface. A total effective focal length f of the optical imaging lens assembly and an entrance pupil diameter EPD of the optical imaging lens assembly may satisfy: $f/EPD<1.6$.

According to another aspect, the present disclosure further provides an optical imaging lens assembly. The optical imaging lens assembly includes, sequentially along an optical axis from an object side to an image side, a first lens, a second lens, a third lens, and a fourth lens. The first lens may have a negative refractive power. The second lens may have a refractive power. The third lens may have a positive refractive power. The fourth lens may have a refractive power. A center thickness CT2 of the second lens on the optical axis and an edge thickness ET2 of the second lens may satisfy: 0.5<CT2/ET2<1.

According to another aspect, the present disclosure further provides an optical imaging lens assembly. The optical imaging lens assembly includes, sequentially along an optical axis from an object side to an image side, a first lens, a second lens, a third lens, and a fourth lens. The first lens may have a negative refractive power. The second lens may have a refractive power. The third lens may have a positive refractive power. The fourth lens may have a refractive power. An effective semi-diameter DT42 of an image-side surface of the fourth lens and half of a diagonal length ImgH of an effective pixel area on an image plane of the optical imaging lens assembly may satisfy: 0.7<DT42/ImgH≤1.0.

According to another aspect, the present disclosure further provides an optical imaging lens assembly. The optical imaging lens assembly includes, sequentially along an optical axis from an object side to an image side, a first lens, a second lens, a third lens, and a fourth lens. The first lens may have a negative refractive power. The second lens may have a refractive power. The third lens may have a positive refractive power. The fourth lens may have a refractive power. A distance SAG41 on the optical axis from an intersection of an object-side surface of the fourth lens and the optical axis to a vertex of an effective semi-diameter of the object-side surface of the fourth lens, and a distance SAG42 on the optical axis from an intersection of an image-side surface of the fourth lens and the optical axis to a vertex of an effective semi-diameter of the image-side surface of the fourth lens may satisfy: 1.0<SAG41/SAG42<1.5.

Through the reasonable configuration, the optical imaging lens assembly has at least one of the beneficial effects such as miniaturization, large aperture, large field-of-view, and high relative illumination while achieving a good imaging quality.

BRIEF DESCRIPTION OF THE DRAWINGS

By describing non-limiting implementations below in detail and in combination with the accompanying drawings, other features, objectives and advantages of the present disclosure will be more apparent. In the accompanying drawings:

FIG. 1 is a schematic structural diagram illustrating an optical imaging lens assembly according to the first embodiment of the present disclosure;

FIGS. 2A-2D respectively illustrate a longitudinal aberration curve, an astigmatic curve, a lateral color curve, and a relative illumination curve of the optical imaging lens assembly according to the first embodiment;

FIGS. 10A-10D respectively illustrate a longitudinal aberration curve, an astigmatic curve, a lateral color curve, and a relative illumination curve of the optical imaging lens assembly according to the fifth embodiment;

DETAILED DESCRIPTION

Figure 2C:
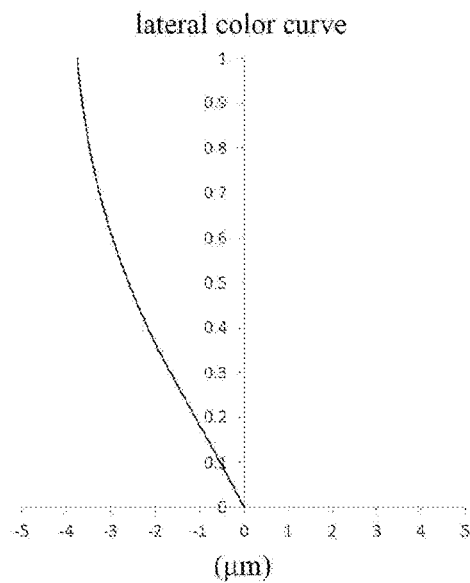

For a better understanding of the present disclosure, various aspects of the present disclosure will be described in more detail with reference to the accompanying drawings. It should be understood that the detailed description is merely an illustration for the illustrative implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second," and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and a position of the convex surface is not defined, it indicates that the surface of the lens is a convex surface at least in the paraxial area; and if a surface of a lens is a concave surface and the position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "illustrative" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Features, principles, and other aspects of the present disclosure are described below in detail.

The optical imaging lens assembly according to illustrative implementations of the present disclosure includes, for example, four lenses (i.e., a first lens, a second lens, a third lens, and a fourth lens) having refractive powers. The four lenses are arranged in sequence along an optical axis from an object side to an image side. The optical imaging lens assembly may further include a photosensitive element disposed on an image plane.

The first lens may have a negative refractive power. At least one of the object-side surface of the first lens or the image-side surface of the first lens may be a concave surface. In an implementation, the image-side surface of the first lens may be a concave surface. The image-side surface of the first lens is arranged as the concave surface, and thus the first lens may have a large negative refractive power in the condition where it is ensured that the first lens has a good processing technology. Accordingly, the imaging system has advantages of large field-of-view and high imaging quality.

The radius of curvature R2 of the image-side surface of the first lens and a total effective focal length f of the optical imaging lens assembly may satisfy: 0.7<R2/f<1.3, and more specifically, R2 and f may further satisfy: 0.85≤R2/f≤1.11. When the conditional expression 0.7<R2/f<1.3 is satisfied, it may be further ensured that the first lens has the good processing technology while the wide-angle characteristics of the imaging system are achieved and the large negative refractive power of the first lens is ensured.

The second lens may have a positive refractive power or a negative refractive power, and at least one of the object-side surface or the image-side surface of the second lens may be a convex surface. In an implementation, the object-side surface of the second lens may be a convex surface.

A center thickness CT2 of the second lens on the optical axis and an edge thickness ET2 of the second lens may satisfy: 0.5<CT2/ET2<1, and more specifically, CT2 and ET2 may further satisfy: 0.57≤CT2/ET2≤0.98. Satisfying the conditional expression 0.5<CT2/ET2<1 helps ensure the processing technology of the second lens and improve the processing precision of the second lens.

The third lens may have a negative refractive power. An effective focal length f1 of the first lens and an effective focal length f3 of the third lens may satisfy: −1.2<f1/f3<−0.5, and more specifically, f1 and f3 may further satisfy: −1.14≤f1/f3≤−0.73. When the conditional expression −1.2<f1/f3<−0.5 is satisfied, it may be ensured that the first lens and the third lens have a positive refractive power and a negative refractive power respectively, which are approximately equal in absolute value, to constitute a reverse telephoto optical structure consisting of a front negative lens assembly and a back positive lens assembly. Such a structure is conducive to enlarging the field-of-view of the imaging system and improving the imaging quality.

The object-side surface of the third lens may be a convex surface, and the image-side surface of the third lens may be a convex surface. The radius of curvature R2 of the image-side surface of the first lens and the radius of curvature R6 of the image-side surface of the third lens may satisfy: −1<R2/R6<−0.5, and more specifically, R2 and R6 may further satisfy: −0.90≤R2/R6≤−0.51. The image-side surface of the first lens and the image-side surface of the third lens have the radii of curvature that are respectively positive and negative and are approximately equal in absolute value, which may be conducive to compensating aberrations and improving the imaging quality.

An effective semi-diameter DT21 of the object-side surface of the second lens and an effective semi-diameter DT32 of the image-side surface of the third lens may satisfy: 0.8<DT21/DT32<1.4, and more specifically, DT21 and DT32 may further satisfy: 0.82≤DT21/DT32≤1.30. The object-side surface of the second lens and the image-side surface of the third lens have the effective semi-diameters that are equal in value, which is conducive to the assembly of the imaging system and improving the assembly precision. At the same time, such an arrangement is also conducive to improving the imaging quality of the imaging system.

The fourth lens has a positive refractive power or a negative refractive power. Alternatively, the fourth lens may have a positive refractive power.

At least one of the object-side surface or the image-side surface of the fourth lens may be a convex surface. In an implementation, the object-side surface of the fourth lens may be a convex surface. The object-side surface of the fourth lens is arranged as the convex surface, which is conducive to ensuring that the chief ray of the imaging system has a small incident angle when entering the image plane, and is also conducive to improving the relative illumination of the image plane.

The center thickness CT2 of the second lens on the optical axis and a center thickness CT4 of the fourth lens on the optical axis may satisfy: CT2/CT4<0.5, and more specifically, CT2 and CT4 may further satisfy: 0.10≤CT2/CT4≤0.44. By reasonably assigning the center thickness of the second lens and the center thickness of the fourth lens, the each lens may have a good manufacturability while the imaging quality of the lens assembly is ensured.

A distance SAG41 on the optical axis from an intersection of the object-side surface of the fourth lens and the optical axis to a vertex of an effective semi-diameter of the object-side surface of the fourth lens, and a distance SAG42 on the optical axis from an intersection of the image-side surface of the fourth lens and the optical axis to a vertex of an effective semi-diameter of the image-side surface of the fourth lens may satisfy: 1.0<SAG41/SAG42<1.5, and more specifically, SAG41 and SAG42 may further satisfy: 1.10≤SAG41/SAG42≤1.44. Satisfying the conditional expression 1<SAG41/SAG42<1.5 helps the imaging system have a small chief ray angle and a high relative illumination. In addition, reasonably configuring SAG41 and SAG42 also helps the fourth lens have a good processability.

The effective semi-diameter DT42 of the image-side surface of the fourth lens and half of a diagonal length ImgH of an effective pixel area on the image plane of the optical imaging lens assembly may satisfy: 0.7<DT42/ImgH≤1.0, and more specifically, DT42 and ImgH may further satisfy: 0.73≤DT42/ImgH≤0.95. When the conditional expression 0.7<DT42/ImgH≤1.0 is satisfied, it may be ensured that the effective semi-diameter of the fourth lens and the half of the diagonal length ImgH of the effective pixel area on the image plane are approximately equal in value, and then it can be ensured that the chief ray angle of the imaging system has a small angle when entering the image plane, thereby improving the relative illumination of the imaging system.

The total effective focal length f of the optical imaging lens assembly and an entrance pupil diameter EPD of the optical imaging lens assembly may satisfy: f/EPD<1.6, and more specifically, f and EPD may further satisfy: 1.19≤f/EPD≤1.48. When the conditional expression f/EPD<1.6 is satisfied, the energy density of the image plane may be effectively improved, and therefore the signal-to-noise ratio of the output signal of the image sensor is improved, that is, the accuracy of measuring a depth is improved.

The half of the diagonal length ImgH of the effective pixel area on the image plane of the optical imaging lens assembly, and the total effective focal length f of the optical imaging lens assembly may satisfy: ImgH/f>1, and more specifically, ImgH and f may further satisfy: 1.34≤ImgH/f≤1.91. When the conditional expression ImgH/f>1 is satisfied, it can be ensured that the imaging system has a large field-of-view, thereby achieving the wide-angle characteristics of the lens assembly.

Alternatively, the optical imaging lens assembly may further include at least one diaphragm, to improve the imaging quality. The diaphragm may be disposed at any position as needed. For example, the diaphragm may be disposed between the second lens and the third lens.

Alternatively, the optical imaging lens assembly described above may further include at least one of an optical filter or a protective glass.

The optical imaging lens assembly according to the above implementations of the present disclosure may use a plurality of lenses, for example, the four lenses described above. By reasonably configuring the refractive powers and the surface types of the lenses, the center thicknesses of the lenses, the spacing distances on the axis between the lenses, etc., it is possible to effectively reduce the size of the lens assembly, reduce the sensitive of the lens assembly and improve the processability of the lens assembly, which makes the lens assembly more conducive to production and processing and applicable to the portable electronic product. At the same time, the optical imaging lens assembly with the above configurations further has beneficial effects such as large aperture, large field-of-view, and high imaging quality, so that the lens assembly can be better applied to the fields of infrared detection and identification.

In the implementations of the present disclosure, at least one of the surfaces of the lenses is an aspheric surface. The aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having four lenses is described as an example in the implementations, the optical imaging lens assembly is not limited to include four lenses. If desired, the optical imaging lens assembly may also include other numbers of lenses.

Specific embodiments of the optical imaging lens assembly that may be applied to the above implementations are further described below with reference to the accompanying drawings.

First Embodiment

An optical imaging lens assembly according to the first embodiment of the present disclosure is described below with reference to FIGS. 1-2D. FIG. 1 is a schematic structural diagram illustrating the optical imaging lens assembly according to the first embodiment of the present disclosure.

As shown in FIG. 1, the optical imaging lens assembly includes, sequentially along an optical axis from an object side to an image side, a first lens L1, a second lens L2, a third lens L3, a fourth lens L4, and an image plane S11. The optical imaging lens assembly may further include a photosensitive element disposed on the image plane S11.

The first lens L1 has a negative refractive power, an object-side surface S1 of the first lens L1 is a convex surface, and an image-side surface S2 of the first lens L1 is a concave surface. The object-side surface S1 and the image-side surface S2 of the first lens L1 are both aspheric surfaces.

The second lens L2 has a positive refractive power, an object-side surface S3 of the second lens L2 is a convex surface, and an image-side surface S4 of the second lens L2 is a concave surface. The object-side surface S3 and the image-side surface S4 of the second lens L2 are both aspheric surfaces.

The third lens L3 has a positive refractive power, an object-side surface S5 of the third lens L3 is a convex surface, and an image-side surface S6 of the third lens L3 is a convex surface. The object-side surface S5 and the image-side surface S6 of the third lens L3 are both aspheric surfaces.

The fourth lens L4 has a positive refractive power, an object-side surface S7 of the fourth lens L4 is a convex surface, and an image-side surface S8 of the fourth lens L4 is a concave surface. The object-side surface S7 and the image-side surface S8 of the fourth lens L4 are both aspheric surfaces.

Alternatively, the optical imaging lens assembly may further include an optical filter L5 having an object-side surface S9 and an image-side surface S10. Light from an object sequentially passes through the surfaces S1-S10 and finally forms an image on the image plane S11.

Alternatively, a diaphragm STO may be disposed between the second lens L2 and the third lens L3, to further improve an imaging quality.

Table 1 shows the surface type, the radius of curvature, the thickness, the material, and the conic coefficient of each lens of the optical imaging lens assembly in the first embodiment. The units of the radius of curvature and the thickness are both millimeters (mm).

TABLE 1

| surface number | surface type | radius of curvature | thickness | material refractive index | abbe number | conic coefficient |
|---|---|---|---|---|---|---|
| OBJ | spherical | infinite | infinite | | | |
| S1 | aspheric | 13.4282 | 0.8065 | 1.53 | 55.8 | 0.0000 |
| S2 | aspheric | 1.1723 | 1.3243 | | | −1.1059 |
| S3 | aspheric | 11.0338 | 0.5000 | 1.62 | 23.5 | −67.5639 |
| S4 | aspheric | 12.4950 | 0.2807 | | | 0.0000 |
| STO | spherical | infinite | 0.2205 | | | |
| S5 | aspheric | 6.5175 | 1.4029 | 1.53 | 55.8 | 18.6778 |
| S6 | aspheric | −1.8609 | 0.7661 | | | −1.4392 |
| S7 | aspheric | 2.4306 | 2.0000 | 1.53 | 55.8 | −0.0393 |
| S8 | aspheric | 2012.6940 | 0.6743 | | | 0.0000 |
| S9 | spherical | infinite | 0.2100 | 1.52 | 64.2 | |
| S10 | spherical | infinite | 0.3759 | | | |
| S11 | spherical | infinite | | | | |

As may be obtained from Table 1, the radius of curvature R2 of the image-side surface S2 of the first lens L1 and the radius of curvature R6 of the image-side surface S6 of the third lens L3 satisfy: R2/R6=−0.63. The center thickness CT2 of the second lens L2 on the optical axis and the center thickness CT4 of the fourth lens L4 on the optical axis satisfy: CT2/CT4=0.25.

In the first embodiment, each lens may be an aspheric lens. The surface type x of each aspheric surface is defined by the following formula:

$$x = \frac{ch^2}{1+\sqrt{1-(k+1)c^2h^2}} + \Sigma A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 1); and Ai is the correction coefficient of the $i^{th}$ order of the aspheric surface. Table 2 below shows the high-order coefficients $A_4$, $A_6$, $A_8$, $A_{10}$, $A_{12}$, $A_{14}$, and $A_{16}$ applicable to the aspheric surfaces S1-S8 in the first embodiment.

TABLE 2

| surface number | A4 | A6 | A8 | A10 | A12 | A14 | A16 |
|---|---|---|---|---|---|---|---|
| S1 | 2.3881E−02 | −1.0376E−02 | 2.3068E−03 | −3.0035E−04 | 2.3028E−05 | −9.5925E−07 | 1.6728E−08 |
| S2 | 5.5580E−02 | 6.7232E−02 | −1.5390E−01 | 1.2259E−01 | −5.3244E−02 | 1.1872E−02 | −1.0351E−03 |
| S3 | −6.0199E−02 | 1.2438E−02 | −3.6378E−02 | 7.0939E−02 | −4.7642E−02 | 1.4781E−02 | −1.8372E−03 |
| S4 | −5.5698E−02 | 2.4854E−01 | −9.5137E−01 | 2.3584E+00 | −3.0815E+00 | 2.0701E+00 | −5.3969E−01 |
| S5 | −6.3203E−02 | 7.6266E−02 | −1.4136E−01 | 1.5507E−01 | −9.9525E−02 | 3.7971E−02 | −6.5824E−03 |
| S6 | −6.0869E−02 | 1.8807E−02 | −2.3483E−02 | 1.1263E−02 | 2.4715E−03 | −4.6087E−03 | 1.2545E−03 |
| S7 | −3.8045E−02 | 1.5354E−02 | −1.1502E−02 | 4.6124E−03 | −1.0751E−03 | 1.2745E−04 | −5.5876E−06 |
| S8 | 9.2110E−02 | −5.0657E−02 | 2.3420E−02 | −8.2491E−03 | 1.8216E−03 | −2.2155E−04 | 1.1284E−05 |

Table 3 shows the total effective focal length f of the optical imaging lens assembly, the effective focal lengths f1-f4 of the lenses, the half of the diagonal length ImgH of the effective pixel area on the image plane S11, and the half of the maximal field-of-view HFOV in the first embodiment.

TABLE 3

| | parameter | | | | | | |
|---|---|---|---|---|---|---|---|
| | f (mm) | f1 (mm) | f2 (mm) | f3 (mm) | f4 (mm) | ImgH (mm) | HFOV (°) |
| numerical value | 1.38 | −2.47 | 134.67 | 2.89 | 4.57 | 2.47 | 80.1 |

As may be obtained from Tables 1 and 3, the effective focal length f1 of the first lens L1 and the effective focal length f3 of the third lens L3 satisfy: f1/f3=−0.86. The half of the diagonal length ImgH of the effective pixel area on the image plane S11 and the total effective focal length f of the optical imaging lens assembly satisfy: ImgH/f=1.79. The radius of curvature R2 of the image-side surface S2 of the first lens L1 and the total effective focal length f of the optical imaging lens assembly satisfy: R2/f=0.85.

In the first embodiment, the total effective focal length f of the optical imaging lens assembly and the entrance pupil diameter EPD of the optical imaging lens assembly satisfy: f/EPD=1.37. The center thickness CT2 of the second lens L2 on the optical axis and the edge thickness ET2 of the second lens L2 satisfy: CT2/ET2=0.79. The effective semi-diameter DT21 of the object-side surface S3 of the second lens L2 and the effective semi-diameter DT32 of the image-side surface S6 of the third lens L3 satisfy: DT21/DT32=0.98. The effective semi-diameter DT42 of the image-side surface S8 of the fourth lens L4 and the half of the diagonal length ImgH of the effective pixel area on the image plane S11 satisfy: DT42/ImgH=0.91. The distance SAG41 on the optical axis from the intersection of the object-side surface S7 of the fourth lens L4 and the optical axis to the vertex of the effective semi-diameter of the object-side surface S7 of the fourth lens L4, and the distance SAG42 on the optical axis from the intersection of the image-side surface S8 of the fourth lens L4 and the optical axis to the vertex of the effective semi-diameter of the image-side surface S8 of the fourth lens L4 satisfy: SAG41/SAG42=1.44.

In the first embodiment, the half of the maximal field-of-view HFOV of the optical imaging lens assembly satisfies: HFOV=80.1°. Accordingly, the lens assembly has wide-angle characteristics.

Figure 2D:
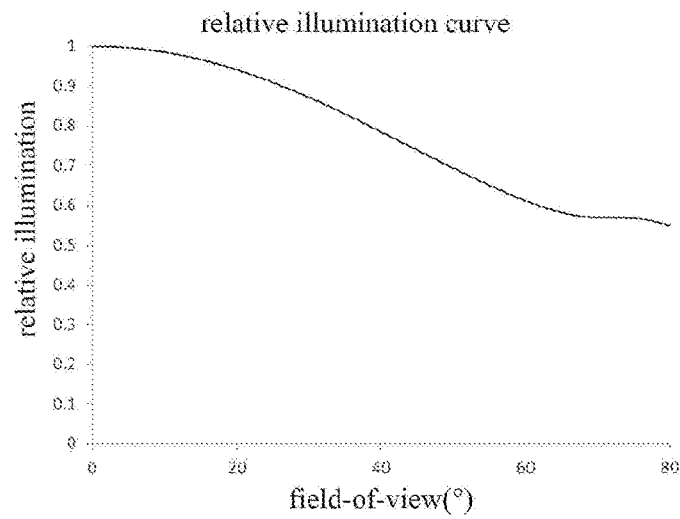

FIG. 2A illustrates the longitudinal aberration curve of the optical imaging lens assembly according to the first embodiment, representing deviations of focal points of light of different wavelengths converged after passing through the lens assembly. FIG. 2B illustrates the astigmatic curve of the optical imaging lens assembly according to the first embodiment, representing a curvature of the tangential image plane and a curvature of the sagittal image plane. FIG. 2C illustrates the lateral color curve of the optical imaging lens assembly according to the first embodiment, representing deviations of different image heights on the image plane after light passes through the lens assembly. FIG. 2D illustrates the relative illumination curve of the optical imaging lens assembly according to the first embodiment, representing relative illuminations corresponding to different fields of view. It can be seen from FIGS. 2A-2D that the optical imaging lens assembly according to the first embodiment may achieve a good imaging quality.

Second Embodiment

Figure 3:
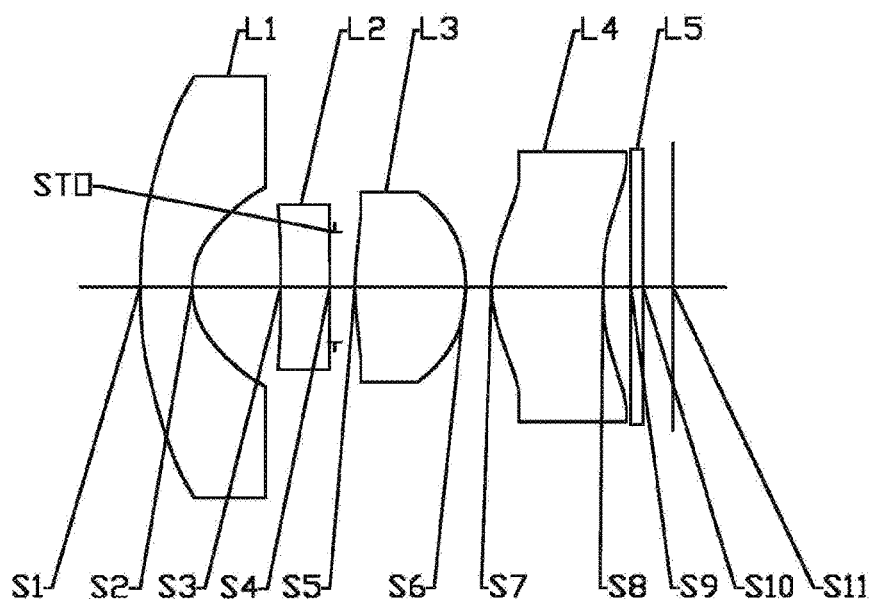
FIG. 3 is a schematic structural diagram illustrating an optical imaging lens assembly according to the second embodiment of the present disclosure.

An optical imaging lens assembly according to the second embodiment of the present disclosure is described below with reference to FIGS. 3-4D. In this embodiment and the following embodiments, for the purpose of brevity, the description of parts similar to those in the first embodiment will be omitted. FIG. 3 is a schematic structural diagram illustrating the optical imaging lens assembly according to the second embodiment of the present disclosure.

As shown in FIG. 3, the optical imaging lens assembly includes, sequentially along an optical axis from an object side to an image side, a first lens L1, a second lens L2, a third lens L3, a fourth lens L4, and an image plane S11. The optical imaging lens assembly may further include a photosensitive element disposed on the image plane S11.

The first lens L1 has a negative refractive power, an object-side surface S1 of the first lens L1 is a convex surface, and an image-side surface S2 of the first lens L1 is a concave surface. The object-side surface S1 and the image-side surface S2 of the first lens L1 are both aspheric surfaces.

The second lens L2 has a positive refractive power, an object-side surface S3 of the second lens L2 is a convex surface, and an image-side surface S4 of the second lens L2 is a convex surface. The object-side surface S3 and the image-side surface S4 of the second lens L2 are both aspheric surfaces.

The third lens L3 has a positive refractive power, an object-side surface S5 of the third lens L3 is a convex surface, and an image-side surface S6 of the third lens L3 is a convex surface. The object-side surface S5 and the image-side surface S6 of the third lens L3 are both aspheric surfaces.

The fourth lens L4 has a positive refractive power, an object-side surface S7 of the fourth lens L4 is a convex surface, and an image-side surface S8 of the fourth lens L4 is a concave surface. The object-side surface S7 and the image-side surface S8 of the fourth lens L4 are both aspheric surfaces.

Alternatively, the optical imaging lens assembly may further include an optical filter L5 having an object-side surface S9 and an image-side surface S10. Light from an object sequentially passes through the surfaces S1-S10 and finally forms an image on the image plane S11.

Alternatively, a diaphragm STO may be disposed between the second lens L2 and the third lens L3, to further improve an imaging quality.

Table 4 shows the surface type, the radius of curvature, the thickness, the material, and the conic coefficient of each lens of the optical imaging lens assembly in the second embodiment. The units of the radius of curvature and the thickness are both millimeters (mm). Table 5 shows the high-order coefficients applicable to each aspheric surface in the second embodiment. The surface type of each aspheric surface may be defined by the formula (1) given in the first embodiment. Table 6 shows the total effective focal length f of the optical imaging lens assembly, the effective focal lengths f1-f4 of the lenses, the half of the diagonal length ImgH of the effective pixel area on the image plane S11, and the half of the maximal field-of-view HFOV in the second embodiment.

TABLE 4

| surface number | surface type | radius of curvature | thickness | refractive index | abbe number | conic coefficient |
|---|---|---|---|---|---|---|
| OBJ | spherical | infinite | infinite | | | |
| S1 | aspheric | 14.3198 | 0.8895 | 1.53 | 55.8 | 0.0000 |
| S2 | aspheric | 1.5091 | 1.5182 | | | −0.5539 |
| S3 | aspheric | 96.0099 | 0.8410 | 1.62 | 23.5 | −3.6994E+25 |
| S4 | aspheric | −37.3580 | 0.0829 | | | 0.0000 |
| STO | spherical | infinite | 0.3461 | | | |
| S5 | aspheric | 4.5647 | 1.9103 | 1.53 | 55.8 | 11.6912 |
| S6 | aspheric | −2.7371 | 0.4408 | | | 0.6238 |
| S7 | aspheric | 1.9162 | 1.9121 | 1.53 | 55.8 | −0.5318 |
| S8 | aspheric | 8.7761 | 0.4726 | | | −4.9887 |
| S9 | spherical | infinite | 0.2100 | 1.52 | 64.2 | |
| S10 | spherical | infinite | 0.5108 | | | |
| S11 | spherical | infinite | | | | |

(material column spans refractive index and abbe number)

TABLE 5

| surface number | A4 | A6 | A8 | A10 | A12 | A14 | A16 |
|---|---|---|---|---|---|---|---|
| S1 | 2.7776E−02 | −9.4783E−03 | 1.7128E−03 | −1.8409E−04 | 1.1936E−05 | −4.2886E−07 | 6.5065E−09 |
| S2 | 6.6834E−02 | −2.4077E−02 | −1.1094E−02 | 9.6166E−03 | −3.3734E−03 | 7.4245E−04 | −7.1898E−05 |
| S3 | −1.9620E−02 | −3.7381E−02 | 7.3131E−02 | −6.1671E−02 | 2.9243E−02 | −7.1735E−03 | 6.9348E−04 |
| S4 | −5.9313E−02 | 3.8040E−01 | −1.7185E+00 | 4.4836E+00 | −6.4092E+00 | 4.7316E+00 | −1.4060E+00 |
| S5 | −6.5877E−02 | 6.9202E−02 | −1.7761E−01 | 2.6497E−01 | −2.3735E−01 | 1.1387E−01 | −2.3129E−02 |
| S6 | −7.7150E−02 | 3.9368E−02 | −1.3219E−02 | 4.0253E−04 | 1.5308E−03 | −5.5756E−04 | 6.4620E−05 |
| S7 | −7.9211E−02 | 3.8506E−02 | −2.2380E−02 | 8.3239E−03 | −1.9424E−03 | 2.5064E−04 | −1.3752E−05 |
| S8 | 8.8430E−02 | −5.8249E−02 | 2.5311E−02 | −8.0056E−03 | 1.5952E−03 | −1.7339E−04 | 7.7465E−06 |

TABLE 6

| | f (mm) | f1 (mm) | f2 (mm) | f3 (mm) | f4 (mm) | ImgH (mm) | HFOV (°) |
|---|---|---|---|---|---|---|---|
| numerical value | 1.43 | −3.25 | 43.51 | 3.54 | 4.20 | 2.45 | 73.8 |

Figure 4A:
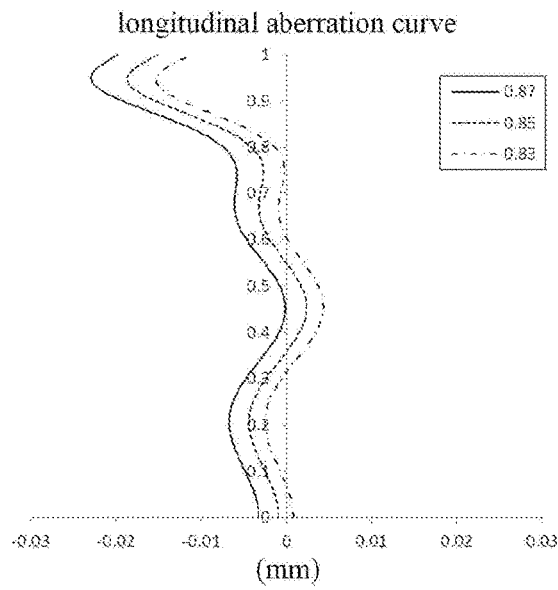
FIGS. 4A-4D respectively illustrate a longitudinal aberration curve, an astigmatic curve, a lateral color curve, and a relative illumination curve of the optical imaging lens assembly according to the second embodiment.
Figure 4B:
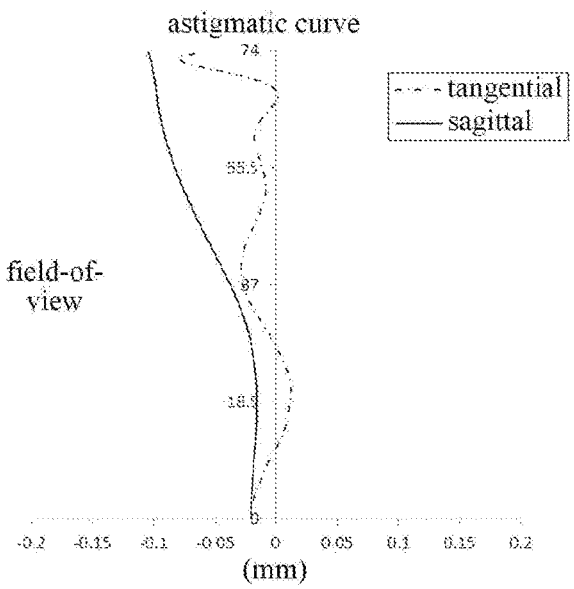
Figure 4C:
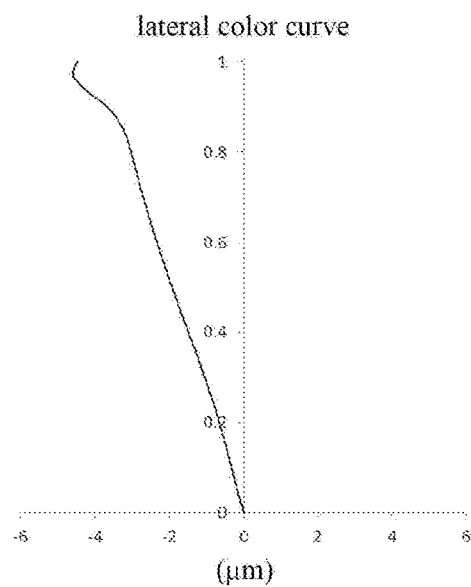
Figure 4D:
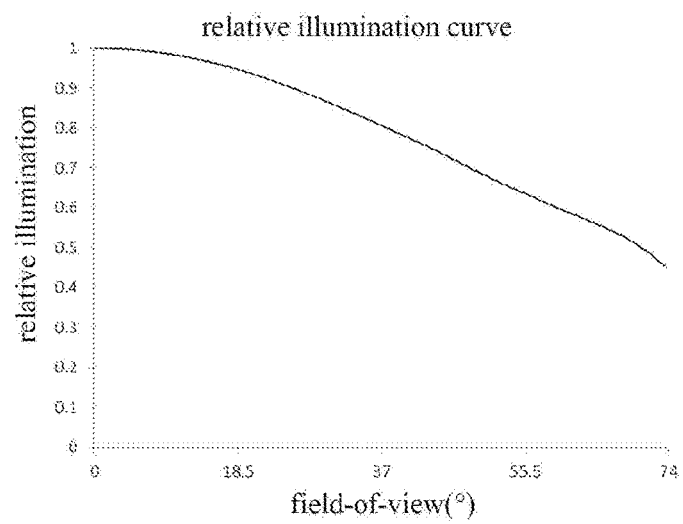

FIG. 4A illustrates the longitudinal aberration curve of the optical imaging lens assembly according to the second embodiment, representing deviations of focal points of light of different wavelengths converged after passing through the lens assembly. FIG. 4B illustrates the astigmatic curve of the optical imaging lens assembly according to the second embodiment, representing a curvature of the tangential image plane and a curvature of the sagittal image plane. FIG. 4C illustrates the lateral color curve of the optical imaging lens assembly according to the second embodiment, representing deviations of different image heights on the image plane after light passes through the lens assembly. FIG. 4D illustrates the relative illumination curve of the optical imaging lens assembly according to the second embodiment, representing relative illuminations corresponding to different fields of view. It can be seen from FIGS. 4A-4D that the optical imaging lens assembly according to the second embodiment can achieve a good imaging quality.

Third Embodiment

Figure 5:
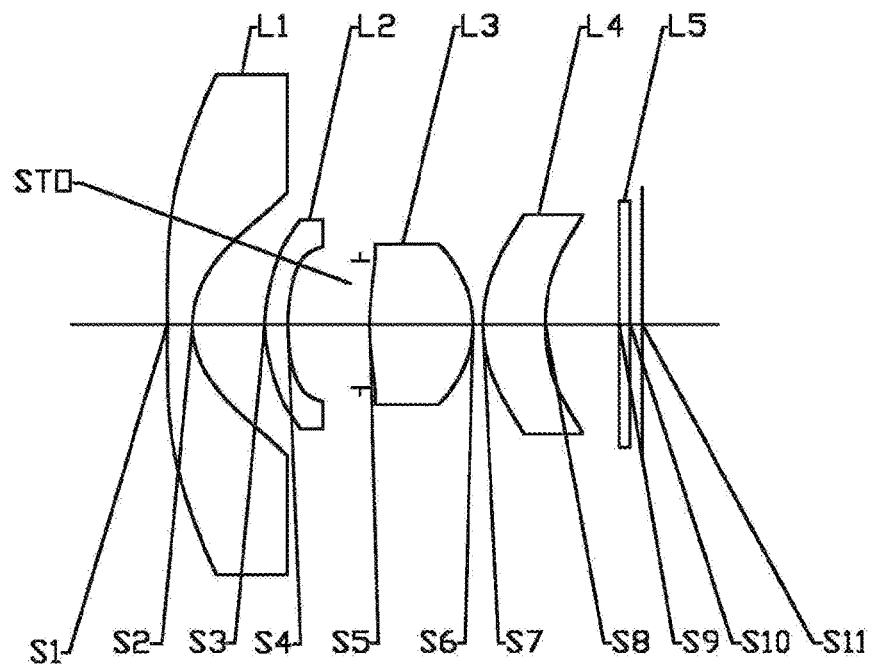
FIG. 5 is a schematic structural diagram illustrating an optical imaging lens assembly according to the third embodiment of the present disclosure.

An optical imaging lens assembly according to the third embodiment of the present disclosure is described below with reference to FIGS. 5-6D. FIG. 5 is a schematic structural diagram illustrating the optical imaging lens assembly according to the third embodiment of the present disclosure.

As shown in FIG. 5, the optical imaging lens assembly includes, sequentially along an optical axis from an object side to an image side, a first lens L1, a second lens L2, a third lens L3, a fourth lens L4, and an image plane S11. The optical imaging lens assembly may further include a photosensitive element disposed on the image plane S11.

The first lens L1 has a negative refractive power, an object-side surface S1 of the first lens L1 is a concave surface, and an image-side surface S2 of the first lens L1 is a concave surface. The object-side surface S1 and the image-side surface S2 of the first lens L1 are both aspheric surfaces.

The second lens L2 has a positive refractive power, an object-side surface S3 of the second lens L2 is a convex surface, and an image-side surface S4 of the second lens L2 is a concave surface. The object-side surface S3 and the image-side surface S4 of the second lens L2 are both aspheric surfaces.

The third lens L3 has a positive refractive power, an object-side surface S5 of the third lens L3 is a convex surface, and an image-side surface S6 of the third lens L3 is a convex surface. The object-side surface S5 and the image-side surface S6 of the third lens L3 are both aspheric surfaces.

The fourth lens L4 has a positive refractive power, an object-side surface S7 of the fourth lens L4 is a convex surface, and an image-side surface S8 of the fourth lens L4 is a concave surface. The object-side surface S7 and the image-side surface S8 of the fourth lens L4 are both aspheric surfaces.

Alternatively, the optical imaging lens assembly may further include an optical filter L5 having an object-side surface S9 and an image-side surface S10. Light from an object sequentially passes through the surfaces S1-S10 and finally forms an image on the image plane S11.

Alternatively, a diaphragm STO may be disposed between the second lens L2 and the third lens L3, to further improve an imaging quality.

Table 7 shows the surface type, the radius of curvature, the thickness, the material, and the conic coefficient of each lens of the optical imaging lens assembly in the third embodiment. The units of the radius of curvature and the thickness are both millimeters (mm). Table 8 shows the high-order coefficients applicable to each aspheric surface in the third embodiment. The surface type of each aspheric surface may be defined by the formula (1) given in the first embodiment. Table 9 shows the total effective focal length f of the optical imaging lens assembly, the effective focal lengths f1-f4 of the lenses, the half of the diagonal length ImgH of the effective pixel area on the image plane S11, and the half of the maximal field-of-view HFOV in the third embodiment.

TABLE 7

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | −81.2658 | 0.4802 | 1.53 | 55.8 | −34.0152 |
| S2 | aspheric | 1.6649 | 1.3906 | | | −4.3923 |
| S3 | aspheric | 2.7336 | 0.4408 | 1.62 | 23.5 | −0.4638 |
| S4 | aspheric | 3.8740 | 1.3920 | | | −10.8758 |
| STO | spherical | infinite | 0.1823 | | | |
| S5 | aspheric | 5.3635 | 2.0003 | 1.53 | 55.8 | −19.8968 |
| S6 | aspheric | −1.9053 | 0.1943 | | | −0.5772 |
| S7 | aspheric | 3.0285 | 1.1933 | 1.62 | 23.5 | −3.4210 |
| S8 | aspheric | 4.2027 | 1.4214 | | | 0.7418 |
| S9 | spherical | infinite | 0.2100 | 1.52 | 64.2 | |
| S10 | spherical | infinite | 0.2328 | | | |
| S11 | spherical | infinite | | | | |

TABLE 8

| surface number | A4 | A6 | A8 | A10 | A12 | A14 | A16 |
|---|---|---|---|---|---|---|---|
| S1 | 7.8114E−03 | −8.7117E−04 | 7.7884E−05 | −4.6945E−06 | 1.6850E−07 | −3.2499E−09 | 2.6435E−11 |
| S2 | 7.9625E−02 | −2.7186E−02 | 7.6673E−03 | −1.4753E−03 | 1.8897E−04 | −1.8010E−05 | 9.2952E−07 |
| S3 | 1.6752E−03 | −4.9169E−02 | 4.3065E−02 | −2.0018E−02 | 5.8328E−03 | −9.4966E−04 | 6.3067E−05 |
| S4 | 9.2638E−02 | −2.2513E−01 | 3.9866E−01 | −4.1070E−01 | 2.5288E−01 | −8.4070E−02 | 1.1798E−02 |
| S5 | 9.0718E−03 | −3.3073E−02 | 7.5884E−02 | −1.0921E−01 | 8.2668E−02 | −3.1478E−02 | 4.7208E−03 |
| S6 | 4.8323E−02 | −7.3135E−02 | 6.9179E−02 | −4.2669E−02 | 1.6199E−02 | −3.4309E−03 | 3.0463E−04 |
| S7 | 4.6008E−02 | −3.1320E−02 | 1.6428E−02 | −5.7079E−03 | 1.2064E−03 | −1.4127E−04 | 6.9419E−06 |
| S8 | 3.1256E−02 | −1.0354E−02 | 2.9840E−03 | −1.0454E−03 | 2.5780E−04 | −3.6544E−05 | 2.1305E−06 |

TABLE 9

| | f (mm) | f1 (mm) | f2 (mm) | f3 (mm) | f4 (mm) | ImgH (mm) | HFOV (°) |
|---|---|---|---|---|---|---|---|
| | \multicolumn{7}{c}{parameter} | | | | | | |
| numerical value | 1.49 | −3.06 | 13.04 | 2.92 | 12.58 | 2.85 | 81.6 |

Figures 6A, 6B:
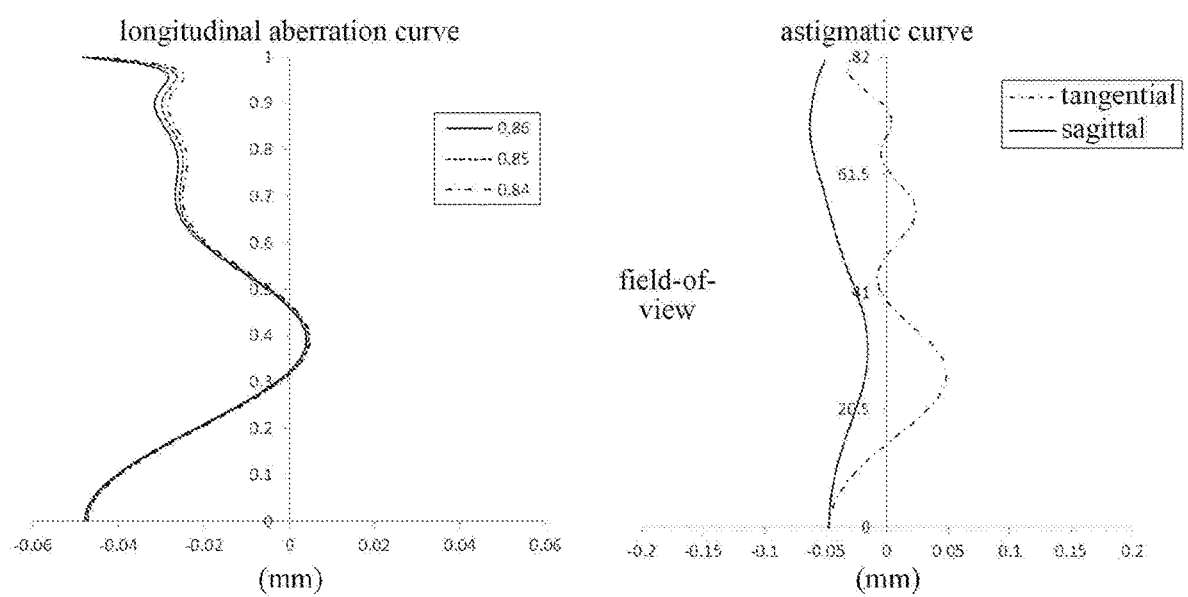
FIGS. 6A-6D respectively illustrate a longitudinal aberration curve, an astigmatic curve, a lateral color curve, and a relative illumination curve of the optical imaging lens assembly according to the third embodiment.
Figure 6C:
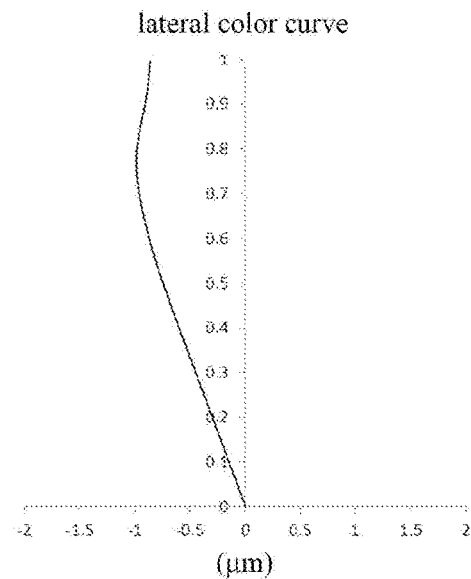
Figure 6D:
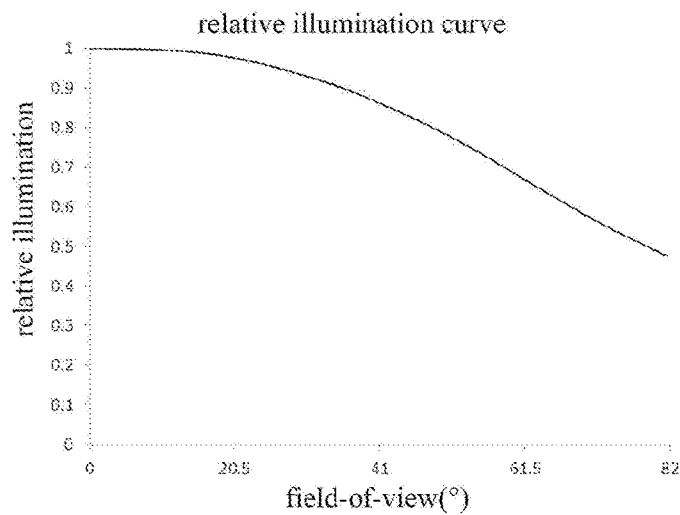

FIG. 6A illustrates the longitudinal aberration curve of the optical imaging lens assembly according to the third embodiment, representing deviations of focal points of light of different wavelengths converged after passing through the lens assembly. FIG. 6B illustrates the astigmatic curve of the optical imaging lens assembly according to the third embodiment, representing a curvature of the tangential image plane and a curvature of the sagittal image plane. FIG. 6C illustrates the lateral color curve of the optical imaging lens assembly according to the third embodiment, representing deviations of different image heights on the image plane after light passes through the lens assembly. FIG. 6D illustrates the relative illumination curve of the optical imaging lens assembly according to the third embodiment, representing relative illuminations corresponding to different fields of view. It can be seen from FIGS. 6A-6D that the optical imaging lens assembly according to the third embodiment can achieve a good imaging quality.

Fourth Embodiment

Figure 7:
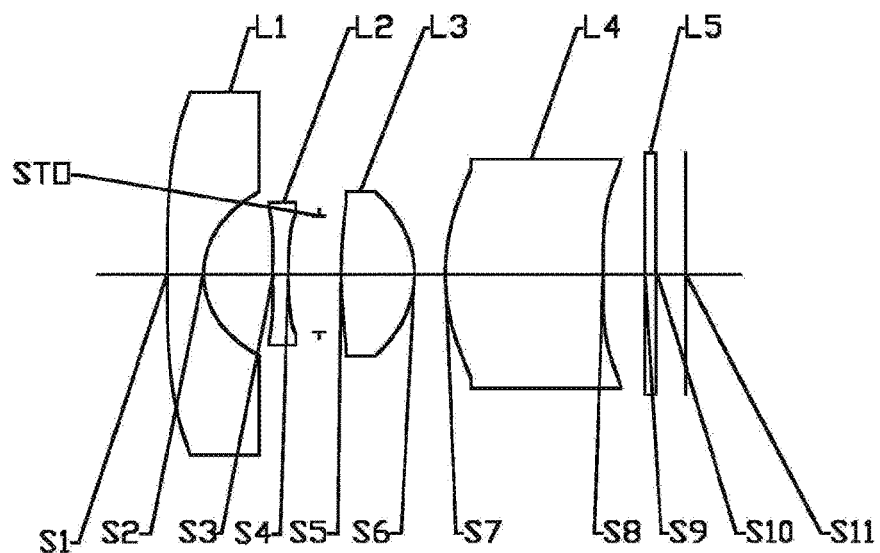
FIG. 7 is a schematic structural diagram illustrating an optical imaging lens assembly according to the fourth embodiment of the present disclosure.

An optical imaging lens assembly according to the fourth embodiment of the present disclosure is described below with reference to FIGS. 7-8D. FIG. 7 is a schematic structural diagram illustrating the optical imaging lens assembly according to the fourth embodiment of the present disclosure.

As shown in FIG. 7, the optical imaging lens assembly includes, sequentially along an optical axis from an object side to an image side, a first lens L1, a second lens L2, a third lens L3, a fourth lens L4, and an image plane S11. The optical imaging lens assembly may further include a photosensitive element disposed on the image plane S11.

The first lens L1 has a negative refractive power, an object-side surface S1 of the first lens L1 is a convex surface, and an image-side surface S2 of the first lens L1 is a concave surface. The object-side surface S1 and the image-side surface S2 of the first lens L1 are both aspheric surfaces.

The second lens L2 has a negative refractive power, an object-side surface S3 of the second lens L2 is a convex surface, and an image-side surface S4 of the second lens L2 is a concave surface. The object-side surface S3 and the image-side surface S4 of the second lens L2 are both aspheric surfaces.

The third lens L3 has a positive refractive power, an object-side surface S5 of the third lens L3 is a convex surface, and an image-side surface S6 of the third lens L3 is a convex surface. The object-side surface S5 and the image-side surface S6 of the third lens L3 are both aspheric surfaces.

The fourth lens L4 has a positive refractive power, an object-side surface S7 of the fourth lens L4 is a convex surface, and an image-side surface S8 of the fourth lens L4 is a convex surface. The object-side surface S7 and the image-side surface S8 of the fourth lens L4 are both aspheric surfaces.

Alternatively, the optical imaging lens assembly may further include an optical filter L5 having an object-side surface S9 and an image-side surface S10. Light from an object sequentially passes through the surfaces S1-S10 and finally forms an image on the image plane S11.

Alternatively, a diaphragm STO may be disposed between the second lens L2 and the third lens L3, to further improve an imaging quality.

Table 10 shows the surface type, the radius of curvature, the thickness, the material, and the conic coefficient of each lens of the optical imaging lens assembly in the fourth embodiment. The units of the radius of curvature and the thickness are both millimeters (mm). Table 11 shows the high-order coefficients applicable to each aspheric surface in the fourth embodiment. The surface type of each aspheric surface may be defined by the formula (1) given in the first embodiment. Table 12 shows the total effective focal length f of the optical imaging lens assembly, the effective focal lengths f1-f4 of the lenses, the half of the diagonal length ImgH of the effective pixel area on the image plane S11, and the half of the maximal field-of-view HFOV in the fourth embodiment.

TABLE 10

| surface number | surface type | radius of curvature | thickness | material refractive index | abbe number | conic coefficient |
|---|---|---|---|---|---|---|
| OBJ | spherical | infinite | infinite | | | |
| S1 | aspheric | 81.9406 | 0.6983 | 1.53 | 55.8 | 0.0000 |
| S2 | aspheric | 1.4897 | 1.3334 | | | −1.2210 |
| S3 | aspheric | 15.2341 | 0.3005 | 1.62 | 23.5 | 0.0000 |
| S4 | aspheric | 6.3864 | 0.5983 | | | 26.2615 |
| STO | spherical | infinite | 0.4211 | | | |
| S5 | aspheric | 8.6304 | 1.4151 | 1.53 | 55.8 | 5.3028 |
| S6 | aspheric | −1.8164 | 0.6077 | | | −0.6023 |
| S7 | aspheric | 4.4201 | 3.0372 | 1.53 | 55.8 | 0.6104 |
| S8 | aspheric | −11.7013 | 0.8048 | | | −5.6784E+25 |
| S9 | spherical | infinite | 0.2100 | 1.52 | 64.2 | |
| S10 | spherical | infinite | 0.5736 | | | |
| S11 | spherical | infinite | | | | |

TABLE 11

| surface number | A4 | A6 | A8 | A10 | A12 | A14 | A16 |
|---|---|---|---|---|---|---|---|
| S1 | 2.1333E−03 | 8.7601E−04 | −3.0458E−04 | 5.2519E−05 | −5.0687E−06 | 2.5785E−07 | −5.3999E−09 |
| S2 | 4.7766E−02 | −6.9272E−02 | 1.1528E−01 | −9.4857E−02 | 4.2403E−02 | −9.4150E−03 | 7.9327E−04 |
| S3 | −7.5276E−02 | 2.8128E−02 | −2.3937E−02 | 3.6464E−02 | −2.9086E−02 | 1.1107E−02 | −1.6234E−03 |
| S4 | −5.9739E−02 | 1.0183E−01 | −2.3753E−01 | 4.1965E−01 | −4.0250E−01 | 1.9828E−01 | −3.9125E−02 |
| S5 | −9.1203E−03 | 1.0113E−02 | −1.1411E−02 | 6.1062E−03 | −1.6721E−03 | 2.7059E−04 | −2.4307E−05 |
| S6 | 9.3936E−03 | −3.4242E−03 | −4.6735E−03 | 5.8714E−03 | −3.1370E−03 | 7.9506E−04 | −7.4892E−05 |
| S7 | 1.4023E−02 | −9.9200E−03 | 4.4130E−03 | −1.5485E−03 | 3.3519E−04 | −3.9104E−05 | 1.8133E−06 |
| S8 | 2.4576E−02 | 4.1503E−04 | −1.7959E−03 | 1.0955E−03 | −3.8345E−04 | 6.2629E−05 | −3.8958E−06 |

TABLE 12

| parameter | | | | | | |
|---|---|---|---|---|---|---|
| f (mm) | f1 (mm) | f2 (mm) | f3 (mm) | f4 (mm) | ImgH (mm) | HFOV (°) |
| numerical value 1.59 | −2.86 | −17.98 | 2.96 | 6.45 | 2.45 | 84.7 |

Figure 8A:
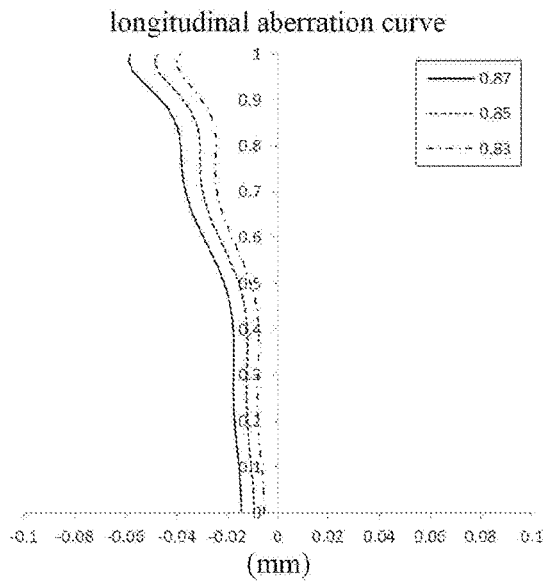
FIGS. 8A-8D respectively illustrate a longitudinal aberration curve, an astigmatic curve, a lateral color curve, and a relative illumination curve of the optical imaging lens assembly according to the fourth embodiment.
Figure 8B:
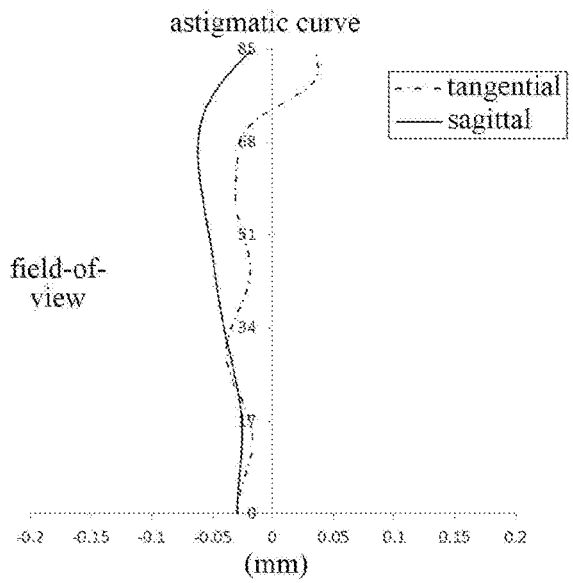
Figure 8C:
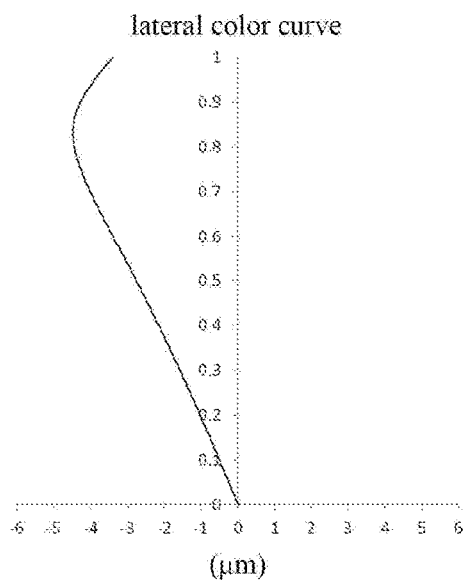
Figure 8D:
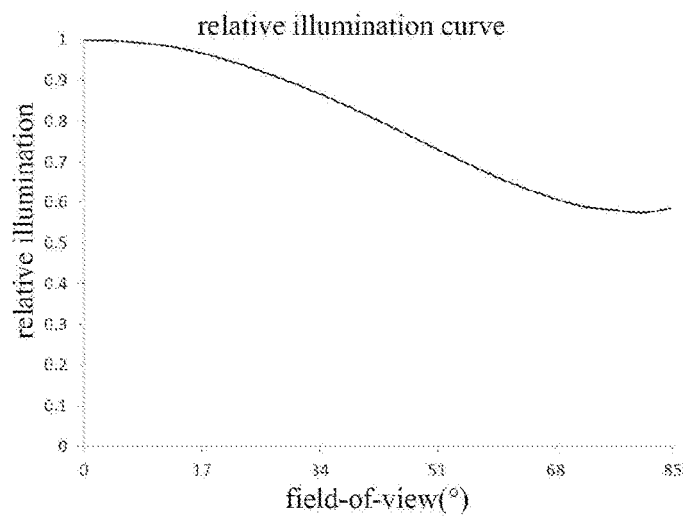

FIG. 8A illustrates the longitudinal aberration curve of the optical imaging lens assembly according to the fourth embodiment, representing deviations of focal points of light of different wavelengths converged after passing through the lens assembly. FIG. 8B illustrates the astigmatic curve of the optical imaging lens assembly according to the fourth embodiment, representing a curvature of the tangential image plane and a curvature of the sagittal image plane. FIG. 8C illustrates the lateral color curve of the optical imaging lens assembly according to the fourth embodiment, representing deviations of different image heights on the image plane after light passes through the lens assembly. FIG. 8D illustrates the relative illumination curve of the optical imaging lens assembly according to the fourth embodiment, representing relative illuminations corresponding to different fields of view. It can be seen from FIGS. 8A-8D that the optical imaging lens assembly according to the fourth embodiment can achieve a good imaging quality.

Fifth Embodiment

Figure 9:
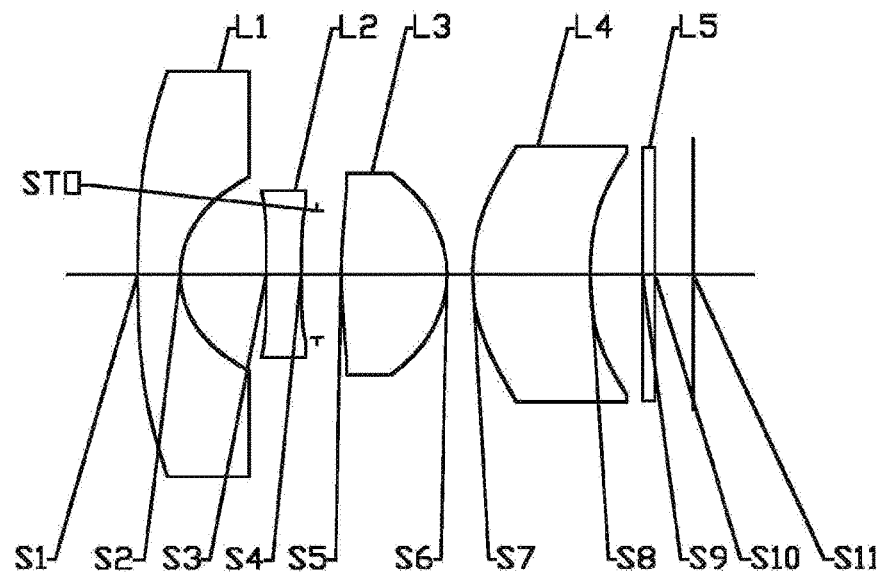
FIG. 9 is a schematic structural diagram illustrating an optical imaging lens assembly according to the fifth embodiment of the present disclosure.

An optical imaging lens assembly according to the fifth embodiment of the present disclosure is described below with reference to FIGS. 9-10D. FIG. 9 is a schematic structural diagram illustrating the optical imaging lens assembly according to the fifth embodiment of the present disclosure.

As shown in FIG. 9, the optical imaging lens assembly includes, sequentially along an optical axis from an object side to an image side, a first lens L1, a second lens L2, a third lens L3, a fourth lens L4, and an image plane S11. The optical imaging lens assembly may further include a photosensitive element disposed on the image plane S11.

The first lens L1 has a negative refractive power, an object-side surface S1 of the first lens L1 is a convex surface, and an image-side surface S2 of the first lens L1 is a concave surface. The object-side surface S1 and the image-side surface S2 of the first lens L1 are both aspheric surfaces.

The second lens L2 has a negative refractive power, an object-side surface S3 of the second lens L2 is a convex surface, and an image-side surface S4 of the second lens L2 is a concave surface. The object-side surface S3 and the image-side surface S4 of the second lens L2 are both aspheric surfaces.

The third lens L3 has a positive refractive power, an object-side surface S5 of the third lens L3 is a convex surface, and an image-side surface S6 of the third lens L3 is a convex surface. The object-side surface S5 and the image-side surface S6 of the third lens L3 are both aspheric surfaces.

The fourth lens L4 has a positive refractive power, an object-side surface S7 of the fourth lens L4 is a convex surface, and an image-side surface S8 of the fourth lens L4 is a concave surface. The object-side surface S7 and the image-side surface S8 of the fourth lens L4 are both aspheric surfaces.

Alternatively, the optical imaging lens assembly may further include an optical filter L5 having an object-side surface S9 and an image-side surface S10. Light from an object sequentially passes through the surfaces S1-S10 and finally forms an image on the image plane S11.

Alternatively, a diaphragm STO may be disposed between the second lens L2 and the third lens L3, to further improve an imaging quality.

Table 13 shows the surface type, the radius of curvature, the thickness, the material, and the conic coefficient of each lens of the optical imaging lens assembly in the fifth embodiment. The units of the radius of curvature and the thickness are both millimeters (mm). Table 14 shows the high-order coefficients applicable to each aspheric surface in the fifth embodiment. The surface type of each aspheric surface may be defined by the formula (1) given in the first embodiment. Table 15 shows the total effective focal length f of the optical imaging lens assembly, the effective focal lengths f1-f4 of the lenses, the half of the diagonal length ImgH of the effective pixel area on the image plane S11, and the half of the maximal field-of-view HFOV in the fifth embodiment.

TABLE 13

| surface number | surface type | radius of curvature | thickness | material refractive index | abbe number | conic coefficient |
|---|---|---|---|---|---|---|
| OBJ | spherical | infinite | infinite | | | |
| S1 | aspheric | 21.6534 | 0.7361 | 1.53 | 55.8 | 0.0000 |
| S2 | aspheric | 1.6307 | 1.4591 | | | −1.1275 |
| S3 | aspheric | 48.6117 | 0.5921 | 1.62 | 23.5 | 0.0000 |
| S4 | aspheric | 17.1507 | 0.2643 | | | 0.0000 |
| STO | spherical | infinite | 0.4140 | | | |
| S5 | aspheric | 7.5808 | 1.8099 | 1.53 | 55.8 | −2.5714 |
| S6 | aspheric | −1.8099 | 0.4314 | | | −0.5071 |
| S7 | aspheric | 3.2850 | 2.0000 | 1.53 | 55.8 | 0.3209 |
| S8 | aspheric | 5.3398 | 0.8883 | | | 0.0000 |
| S9 | spherical | infinite | 0.2100 | 1.52 | 64.2 | |

TABLE 13-continued

| surface number | surface type | radius of curvature | thickness | material refractive index | abbe number | conic coefficient |
|---|---|---|---|---|---|---|
| S10 | spherical | infinite | 0.6497 | | | |
| S11 | spherical | infinite | | | | |

TABLE 14

| surface number | A4 | A6 | A8 | A10 | A12 | A14 | A16 |
|---|---|---|---|---|---|---|---|
| S1 | 4.5400E−03 | −5.3624E−04 | −1.4910E−05 | 1.7887E−05 | −2.5896E−06 | 1.5808E−07 | −3.6392E−09 |
| S2 | 4.4641E−02 | −3.2483E−02 | 5.6725E−02 | −4.9217E−02 | 2.3141E−02 | −5.3211E−03 | 4.5733E−04 |
| S3 | −3.2870E−02 | −9.5164E−03 | 4.7532E−02 | −6.8414E−02 | 4.8439E−02 | −1.6496E−02 | 2.1575E−03 |
| S4 | −3.1480E−02 | 1.4375E−01 | −3.7668E−01 | 6.5893E−01 | −6.6403E−01 | 3.5847E−01 | −7.8597E−02 |
| S5 | −1.2423E−02 | 4.0228E−03 | −8.0603E−04 | −4.3021E−03 | 4.1936E−03 | −1.4591E−03 | 1.7929E−04 |
| S6 | 8.3009E−03 | −5.1026E−03 | 8.2095E−04 | 1.1760E−04 | −1.2137E−04 | 1.6078E−05 | 8.7169E−07 |
| S7 | 5.2285E−03 | −2.0828E−03 | −1.4501E−03 | 1.0758E−03 | −3.3693E−04 | 4.9948E−05 | −2.8871E−06 |
| S8 | 1.5788E−02 | 2.8522E−03 | −2.9971E−03 | 1.5274E−03 | −4.8658E−04 | 7.6796E−05 | −4.6875E−06 |

TABLE 15

| | parameter | | | | | | |
|---|---|---|---|---|---|---|---|
| | f (mm) | f1 (mm) | f2 (mm) | f3 (mm) | f4 (mm) | ImgH (mm) | HFOV (°) |
| numerical value | 1.73 | −3.36 | −43.08 | 2.94 | 11.99 | 2.32 | 77.6 |

Figures 10A, 10B:
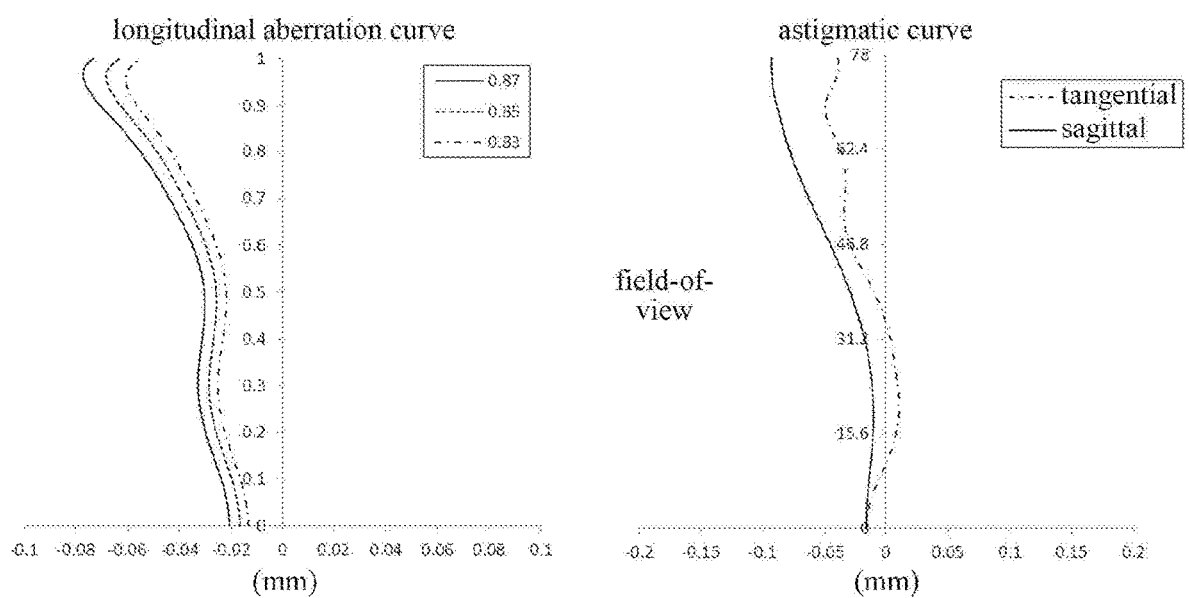

FIG. 10A illustrates the longitudinal aberration curve of the optical imaging lens assembly according to the fifth embodiment, representing deviations of focal points of light of different wavelengths converged after passing through the lens assembly. FIG. 10B illustrates the astigmatic curve of the optical imaging lens assembly according to the fifth embodiment, representing a curvature of the tangential image plane and a curvature of the sagittal image plane. FIG. 10C illustrates the lateral color curve of the optical imaging lens assembly according to the fifth embodiment, representing deviations of different image heights on the image plane after light passes through the lens assembly. FIG. 10D illustrates the relative illumination curve of the optical imaging lens assembly according to the fifth embodiment, representing relative illuminations corresponding to different fields of view. It can be seen from FIGS. 10A-10D that the optical imaging lens assembly according to the fifth embodiment can achieve a good imaging quality.

Sixth Embodiment

Figure 11:
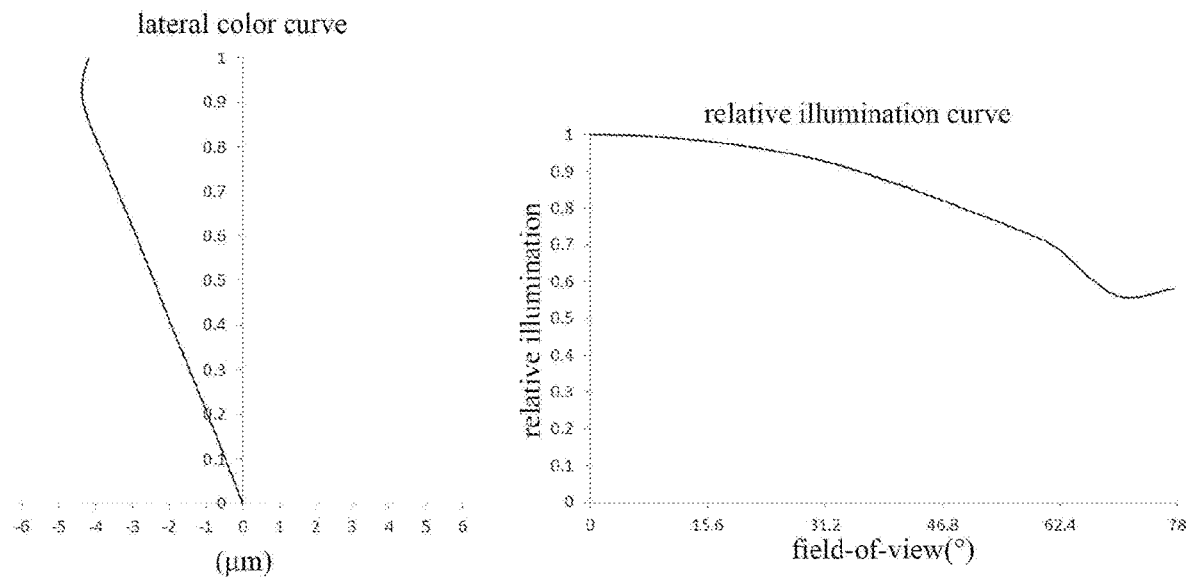
FIG. 11 is a schematic structural diagram illustrating an optical imaging lens assembly according to the sixth embodiment of the present disclosure.
Figure 11:
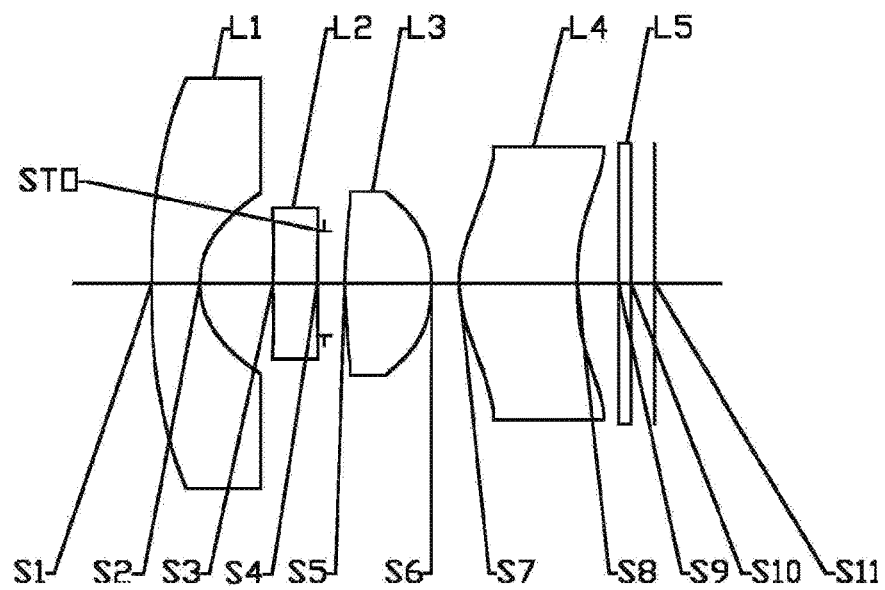

An optical imaging lens assembly according to the sixth embodiment of the present disclosure is described below with reference to FIGS. 11-12D. FIG. 11 is a schematic structural diagram illustrating the optical imaging lens assembly according to the sixth embodiment of the present disclosure.

As shown in FIG. 11, the optical imaging lens assembly includes, sequentially along an optical axis from an object side to an image side, a first lens L1, a second lens L2, a third lens L3, a fourth lens L4, and an image plane S11. The optical imaging lens assembly may further include a photosensitive element disposed on the image plane S11.

The first lens L1 has a negative refractive power, an object-side surface S1 of the first lens L1 is a convex surface, and an image-side surface S2 of the first lens L1 is a concave surface. The object-side surface S1 and the image-side surface S2 of the first lens L1 are both aspheric surfaces.

The second lens L2 has a positive refractive power, an object-side surface S3 of the second lens L2 is a convex surface, and an image-side surface S4 of the second lens L2 is a concave surface. The object-side surface S3 and the image-side surface S4 of the second lens L2 are both aspheric surfaces.

The third lens L3 has a positive refractive power, an object-side surface S5 of the third lens L3 is a convex surface, and an image-side surface S6 of the third lens L3 is a convex surface. The object-side surface S5 and the image-side surface S6 of the third lens L3 are both aspheric surfaces.

The fourth lens L4 has a positive refractive power, an object-side surface S7 of the fourth lens L4 is a convex surface, and an image-side surface S8 of the fourth lens L4 is a concave surface. The object-side surface S7 and the image-side surface S8 of the fourth lens L4 are both aspheric surfaces.

Alternatively, the optical imaging lens assembly may further include an optical filter L5 having an object-side surface S9 and an image-side surface S10. Light from an object sequentially passes through the surfaces S1-S10 and finally forms an image on the image plane S11.

Alternatively, a diaphragm STO may be disposed between the second lens L2 and the third lens L3, to further improve an imaging quality.

Table 16 shows the surface type, the radius of curvature, the thickness, the material, and the conic coefficient of each lens of the optical imaging lens assembly in the sixth embodiment. The units of the radius of curvature and the thickness are both millimeters (mm). Table 17 shows the high-order coefficients applicable to each aspheric surface in the sixth embodiment. The surface type of each aspheric surface may be defined by the formula (1) given in the first embodiment. Table 18 shows the total effective focal length f of the optical imaging lens assembly, the effective focal lengths f1-f4 of the lenses, the half of the diagonal length ImgH of the effective pixel area on the image plane S11, and the half of the maximal field-of-view HFOV in the sixth embodiment.

TABLE 16

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1068.4390 | 0.8106 | 1.53 | 55.8 | 0.0000 |

TABLE 16-continued

| surface number | surface type | radius of curvature | thickness | material refractive index | abbe number | conic coefficient |
|---|---|---|---|---|---|---|
| S2 | aspheric | 1.4792 | 1.2393 | | | −0.7475 |
| S3 | aspheric | 11.0136 | 0.7533 | 1.62 | 23.5 | −43.6110 |
| S4 | aspheric | 45.6866 | 0.1107 | | | 0.0000 |
| STO | spherical | infinite | 0.3494 | | | |
| S5 | aspheric | 5.6161 | 1.4764 | 1.53 | 55.8 | 10.7649 |
| S6 | aspheric | −2.8804 | 0.4712 | | | −0.0069 |
| S7 | aspheric | 1.8061 | 2.0000 | 1.53 | 55.8 | −0.4098 |
| S8 | aspheric | 7.6725 | 0.6995 | | | −1.2053 |
| S9 | spherical | infinite | 0.2100 | 1.52 | 64.2 | |
| S10 | spherical | infinite | 0.4010 | | | |
| S11 | spherical | infinite | | | | |

TABLE 17

| surface number | A4 | A6 | A8 | A10 | A12 | A14 | A16 |
|---|---|---|---|---|---|---|---|
| S1 | 2.3757E−02 | −7.2283E−03 | 1.3820E−03 | −1.6669E−04 | 1.2338E−05 | −5.0722E−07 | 8.8125E−09 |
| S2 | 2.5422E−02 | 8.7594E−02 | −1.6320E−01 | 1.4784E−01 | −7.5523E−02 | 2.0181E−02 | −2.1608E−03 |
| S3 | −3.7117E−02 | 1.1130E−02 | −6.4491E−02 | 1.2129E−01 | −1.0089E−01 | 4.1578E−02 | −6.8791E−03 |
| S4 | −2.9738E−02 | −5.3272E−02 | 6.4035E−01 | −2.1272E+00 | 3.5357E+00 | −2.8668E+00 | 9.1160E−01 |
| S5 | −5.5391E−02 | 2.8572E−02 | −3.5312E−02 | 2.7512E−02 | −1.2867E−02 | 4.4917E−03 | −7.8006E−04 |
| S6 | −1.0383E−01 | 3.3561E−02 | 2.4952E−02 | −5.5329E−02 | 3.9310E−02 | −1.3183E−02 | 1.7516E−03 |
| S7 | −9.9204E−02 | 4.8038E−02 | −2.6240E−02 | 9.0335E−03 | −1.9715E−03 | 2.4638E−04 | −1.3575E−05 |
| S8 | 5.0984E−02 | −1.9611E−02 | 4.8247E−03 | −1.4225E−03 | 3.4463E−04 | −4.6596E−05 | 2.5287E−06 |

TABLE 18

| parameter | f (mm) | f1 (mm) | f2 (mm) | f3 (mm) | f4 (mm) | ImgH (mm) | HFOV (°) |
|---|---|---|---|---|---|---|---|
| numerical value | 1.51 | −2.79 | 23.23 | 3.81 | 3.97 | 2.45 | 81.1 |

Figure 12A:
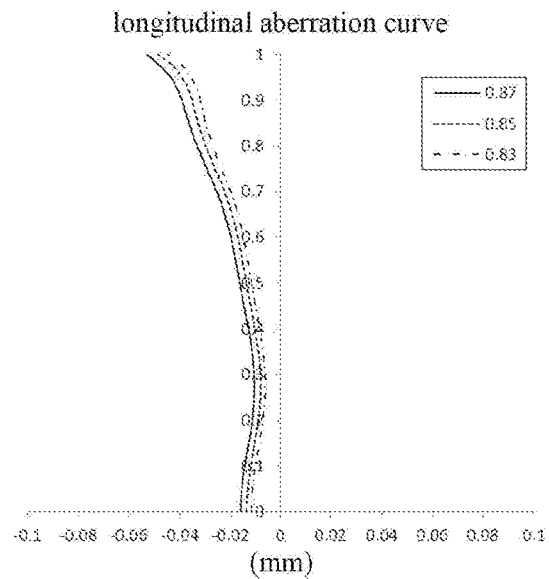
FIGS. 12A-12D respectively illustrate a longitudinal aberration curve, an astigmatic curve, a lateral color curve, and a relative illumination curve of the optical imaging lens assembly according to the sixth embodiment.
Figure 12B:
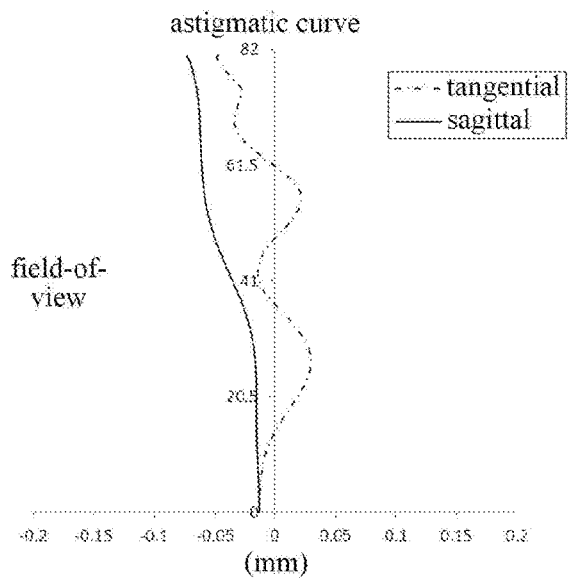
Figure 12C:
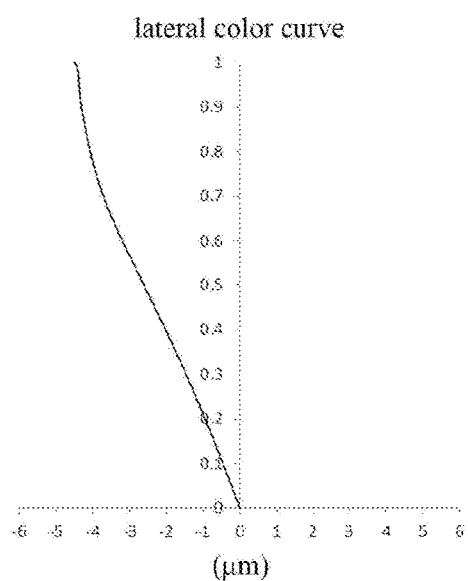
Figure 12D:
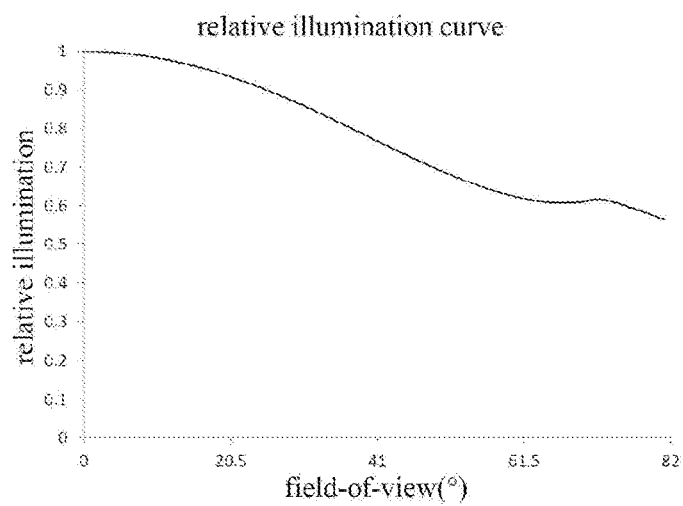

FIG. 12A illustrates the longitudinal aberration curve of the optical imaging lens assembly according to the sixth embodiment, representing deviations of focal points of light of different wavelengths converged after passing through the lens assembly. FIG. 12B illustrates the astigmatic curve of the optical imaging lens assembly according to the sixth embodiment, representing a curvature of the tangential image plane and a curvature of the sagittal image plane. FIG. 12C illustrates the lateral color curve of the optical imaging lens assembly according to the sixth embodiment, representing deviations of different image heights on the image plane after light passes through the lens assembly. FIG. 12D illustrates the relative illumination curve of the optical imaging lens assembly according to the sixth embodiment, representing relative illuminations corresponding to different fields of view. It can be seen from FIGS. 12A-12D that the optical imaging lens assembly according to the sixth embodiment can achieve a good imaging quality.

To sum up, the first to the sixth embodiments respectively satisfy the relationships shown in Table 19 below.

TABLE 19

| Conditional Expression | Embodiment 1 | 2 | 3 | 4 | 5 | 6 |
|---|---|---|---|---|---|---|
| f/EPD | 1.37 | 1.28 | 1.19 | 1.38 | 1.38 | 1.48 |
| f1/f3 | −0.86 | −0.92 | −1.05 | −0.97 | −1.14 | −0.73 |
| ImgH/f | 1.79 | 1.71 | 1.91 | 1.54 | 1.34 | 1.62 |
| R2/R6 | −0.63 | −0.55 | −0.87 | −0.82 | −0.90 | −0.51 |
| R2/f | 0.85 | 1.06 | 1.11 | 0.94 | 0.94 | 0.98 |
| CT2/CT4 | 0.25 | 0.44 | 0.37 | 0.10 | 0.30 | 0.38 |
| CT2/ET2 | 0.79 | 0.96 | 0.98 | 0.57 | 0.79 | 0.97 |
| DT21/DT32 | 0.98 | 0.87 | 1.30 | 0.87 | 0.83 | 0.82 |
| DT42/ImgH | 0.91 | 0.95 | 0.73 | 0.90 | 0.90 | 0.95 |
| SAG41/SAG42 | 1.44 | 1.18 | 1.10 | 1.43 | 1.20 | 1.27 |

The present disclosure further provides an imaging device having a photosensitive element which may be a photosensitive charge-coupled device (CCD) or complementary metal-oxide semiconductor (CMOS) element. The imaging device may be an independent imaging device such as a digital camera, or may be an imaging module integrated in a mobile electronic device such as a mobile phone, or a tablet computer. The imaging device is equipped with the optical imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. An optical imaging lens assembly consisting of one first lens, one second lens, one third lens, and one fourth lens, sequentially along an optical axis from an object side to an image side,
    wherein the first lens has a negative refractive power;
    the third lens has a positive refractive power;
    at least one of the second lens or the fourth lens has a positive refractive power; and
    a center thickness CT2 of the second lens on the optical axis and a center thickness CT4 of the fourth lens on the optical axis satisfy: CT2/CT4<0.5;
    half of a diagonal length ImgH of an effective pixel area on an image plane of the optical imaging lens assembly and a total effective focal length f of the optical imaging lens assembly satisfy: ImgH/f>1.

2. The optical imaging lens assembly according to claim 1, wherein an image-side surface of the first lens is a concave surface.

3. The optical imaging lens assembly according to claim 2, wherein a radius of curvature R2 of the image-side surface of the first lens and the total effective focal length f of the optical imaging lens assembly satisfy: 0.7<R2/f<1.3.

4. The optical imaging lens assembly according to claim 2, wherein an image-side surface of the third lens is a convex surface, a radius of curvature R2 of the image-side surface of the first lens and a radius of curvature R6 of the image-side surface of the third lens satisfy: −1<R2/R6<−0.5.

5. The optical imaging lens assembly according to claim 1, wherein the center thickness CT2 of the second lens on the optical axis and an edge thickness ET2 of the second lens satisfy: 0.5<CT2/ET2<1.

6. The optical imaging lens assembly according to claim 1, wherein an effective semi-diameter DT21 of an object-side surface of the second lens and an effective semi-diameter DT32 of an image-side surface of the third lens satisfy: 0.8<DT21/DT32<1.4.

7. The optical imaging lens assembly according to claim 1, wherein an object-side surface of the fourth lens is a convex surface.

8. The optical imaging lens assembly according to claim 7, wherein an effective semi-diameter DT42 of an image-side surface of the fourth lens and half of the diagonal length ImgH of the effective pixel area on the image plane of the optical imaging lens assembly satisfy: 0.7<DT42/ImgH≤1.0.

9. The optical imaging lens assembly according to claim 7, satisfying 1.0<SAG41/SAG42<1.5,
wherein SAG41 is a distance on the optical axis from an intersection of the object-side surface of the fourth lens and the optical axis to a vertex of an effective semi-diameter of the object-side surface of the fourth lens, and
SAG42 is a distance on the optical axis from an intersection of an image-side surface of the fourth lens and the optical axis to a vertex of an effective semi-diameter of the image-side surface of the fourth lens.

10. The optical imaging lens assembly according to claim 1, wherein an effective focal length f1 of the first lens and an effective focal length f3 of the third lens satisfy: −1.2<f1/f3<−0.5.

11. An optical imaging lens assembly consisting of one first lens, one second lens, one third lens, and one fourth lens, sequentially along an optical axis from an object side to an image side,
wherein the first lens has a negative refractive power;
the second lens has a refractive power;
the third lens has a positive refractive power, and an object-side surface and an image-side surface of the third lens are convex surfaces;
the fourth lens has a refractive power, and an object-side surface of the fourth lens is a convex surface; and
a total effective focal length f of the optical imaging lens assembly and an entrance pupil diameter EPD of the optical imaging lens assembly satisfy: f/EPD<1.6;
half of a diagonal length ImgH of an effective pixel area on an image plane of the optical imaging lens assembly and the total effective focal length f of the optical imaging lens assembly satisfy: ImgH/f>1.

12. The optical imaging lens assembly according to claim 11, wherein a radius of curvature R2 of an image-side surface of the first lens and a radius of curvature R6 of the image-side surface of the third lens satisfy: −1<R2/R6<−0.5.

13. The optical imaging lens assembly according to claim 12, wherein the image-side surface of the first lens is a concave surface, and the image-side surface of the third lens is a convex surface.

14. The optical imaging lens assembly according to claim 11, wherein a center thickness CT2 of the second lens on the optical axis and an edge thickness ET2 of the second lens satisfy: 0.5<CT2/ET2<1.

15. The optical imaging lens assembly according to claim 14, wherein the center thickness CT2 of the second lens on the optical axis and a center thickness CT4 of the fourth lens on the optical axis satisfy: CT2/CT4<0.5.

16. The optical imaging lens assembly according to claim 11, wherein an effective semi-diameter DT21 of an object-side surface of the second lens and an effective semi-diameter DT32 of the image-side surface of the third lens satisfy: 0.8<DT21/DT32<1.4.

17. The optical imaging lens assembly according to claim 11, wherein an effective semi-diameter DT42 of an image-side surface of the fourth lens and the half of the diagonal length ImgH of the effective pixel area on the image plane of the optical imaging lens assembly satisfy: 0.7<DT42/ImgH<1.0.

18. The optical imaging lens assembly according to claim 11, satisfying 1.0<SAG41/SAG42<1.5, wherein SAG41 is a distance on the optical axis from an intersection of the object-side surface of the fourth lens and the optical axis to a vertex of an effective semi-diameter of the object-side surface of the fourth lens, and SAG42 is a distance on the optical axis from an intersection of an image-side surface of the fourth lens and the optical axis to a vertex of an effective semi-diameter of the image-side surface of the fourth lens.

* * * * *